(12) United States Patent
Fujimoto et al.

(10) Patent No.: US 7,362,917 B2
(45) Date of Patent: *Apr. 22, 2008

(54) APPARATUS AND METHOD FOR CORRECTING DISTORTION OF INPUT IMAGE

(75) Inventors: Katsuhito Fujimoto, Kawasaki (JP); Atsuko Ohara, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1 day.

This patent is subject to a terminal disclaimer.

(21) Appl. No.: 11/102,702

(22) Filed: Apr. 11, 2005

(65) Prior Publication Data

US 2005/0175255 A1 Aug. 11, 2005

Related U.S. Application Data

(63) Continuation of application No. 09/819,728, filed on Mar. 29, 2001, now Pat. No. 6,970,592.

(30) Foreign Application Priority Data

Sep. 4, 2000 (JP) .............................. 2000-267511

(51) Int. Cl.
*G06K 9/40* (2006.01)
*H04N 1/40* (2006.01)
*H04N 1/46* (2006.01)

(52) U.S. Cl. ...................... 382/275; 358/471; 358/505

(58) Field of Classification Search ................ 382/154, 382/285, 289, 293, 275; 358/471–497, 505; 399/362, 395; 250/208.1, 234–236

See application file for complete search history.

(56) References Cited

U.S. PATENT DOCUMENTS

| 5,497,236 | A | 3/1996 | Wolff et al. |
| 5,760,925 | A | 6/1998 | Saund et al. |
| 5,940,544 | A | 8/1999 | Nako |
| 6,014,470 | A | 1/2000 | Matsuda |
| 7,072,527 | B1 * | 7/2006 | Nako ........................ 382/290 |

FOREIGN PATENT DOCUMENTS

| JP | 8-306247 | 11/1996 |
| JP | 10-150532 | 6/1998 |
| JP | P2000-20682 A | * 1/2000 |

OTHER PUBLICATIONS

European Patent Office, communication, Jan. 30, 2003, pp. 1-4.
Yuan Y. Tang et al., Image Transformation Approach to Nonlinear Shape Restoration; Jan./Feb. 1993; pp. 155-172.
Yun Weng et al., Nonlinear Shape Restoration For Document Images; Jun. 18, 1996, pp. 568-573.
Ardeshir Goshtasby; Correction of Image Deformation from Lens Distortion Using Bezier Patches; Feb. 19, 1987; pp. 385-394.
U.S. Appl. No. 09/819,728, Filed Mar. 29, 2001, Fujimoto et al.
Korean Office Action mailed Jan. 31, 2007 in corresponding Korean Application. No. 10-2001-16969.
Yuan Y. Tang, et al. "Image Transforming Approach to Nonlinear Shape Restoration," IEEE, 1993, pp. 155-172.

* cited by examiner

*Primary Examiner*—Aaron W. Carter
(74) *Attorney, Agent, or Firm*—Staas & Halsey LLP

(57) ABSTRACT

A three-dimensional curved-surface model can be estimated by using both two-dimensional outlines obtained from a piece of image photographed from the top and a restriction that the paper is rectangular. Then, only the three-dimensional distortion in the image can be corrected based on the obtained three-dimensional curved-surface model.

6 Claims, 23 Drawing Sheets

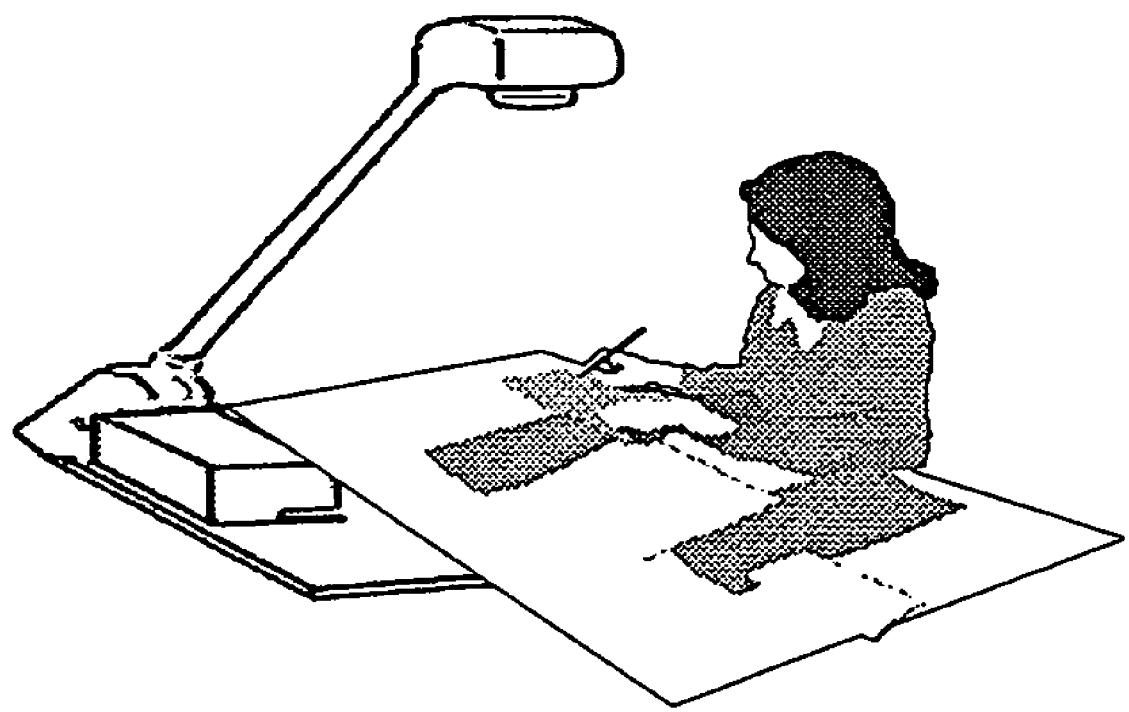
F I G. 1 A

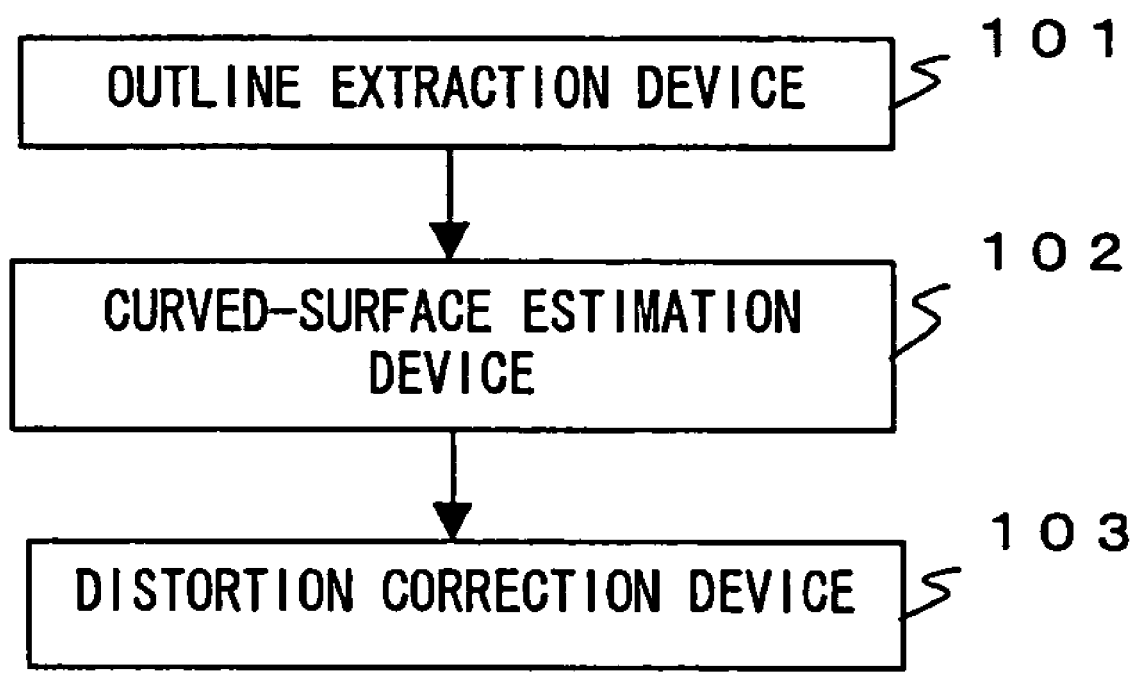
F I G. 2 A

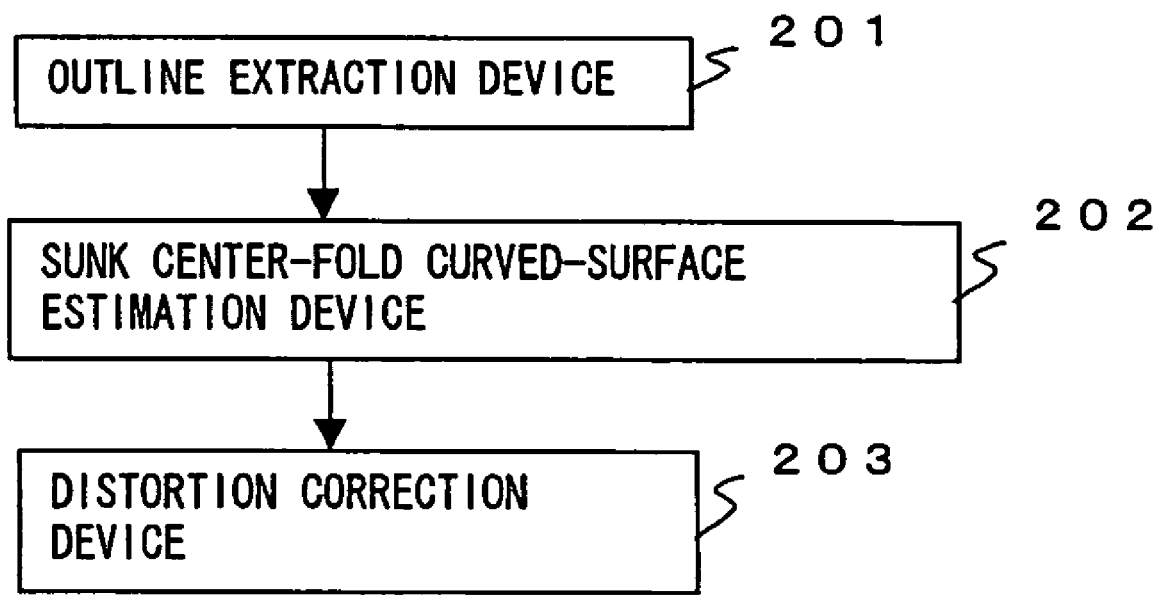
F I G. 2 B

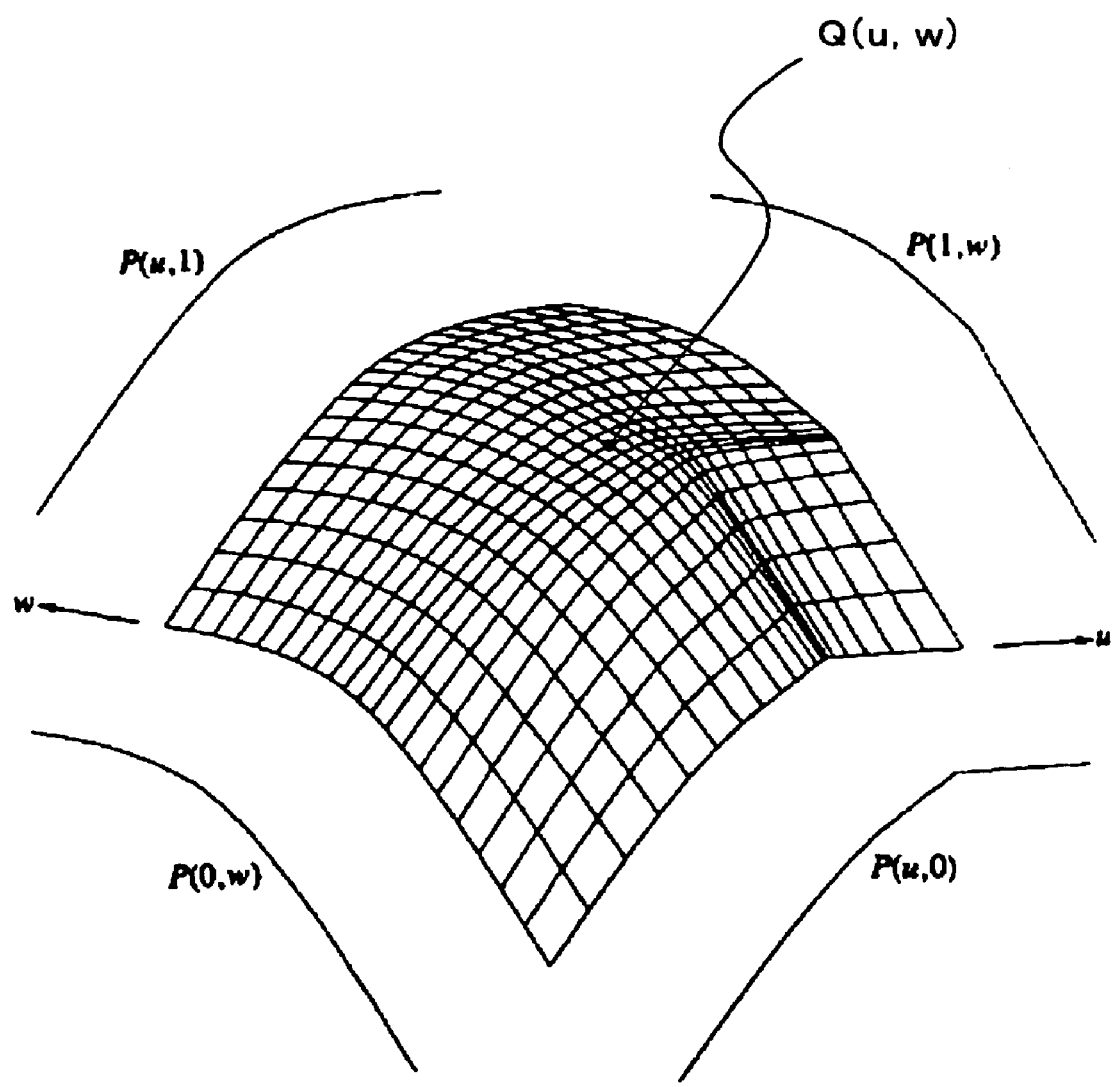
F I G. 6

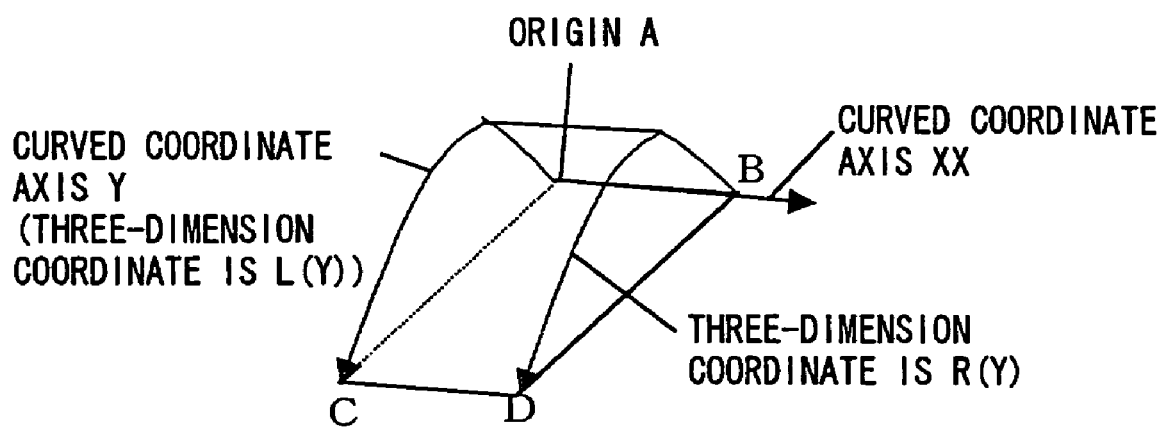
F I G. 7

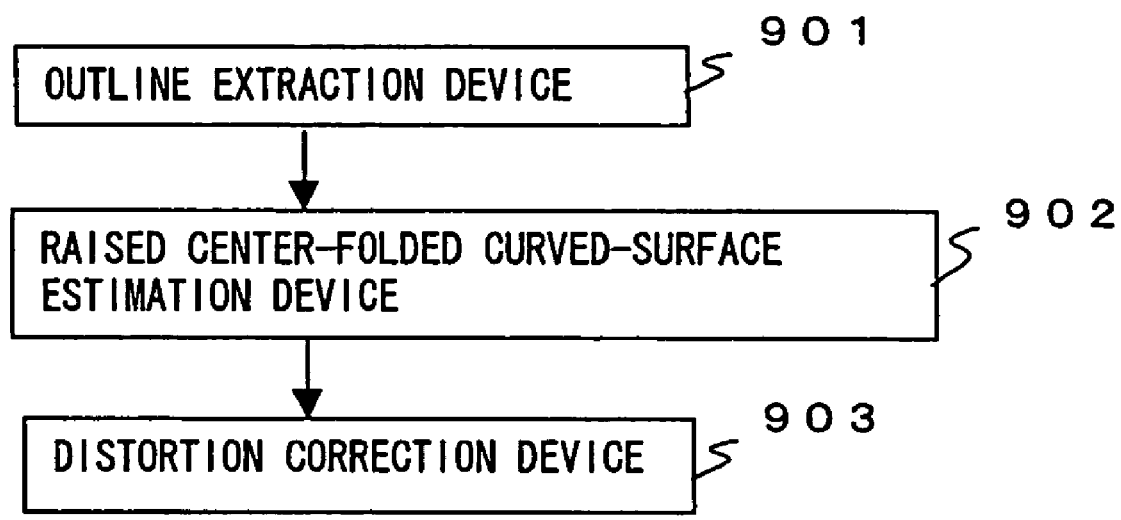
F I G. 9

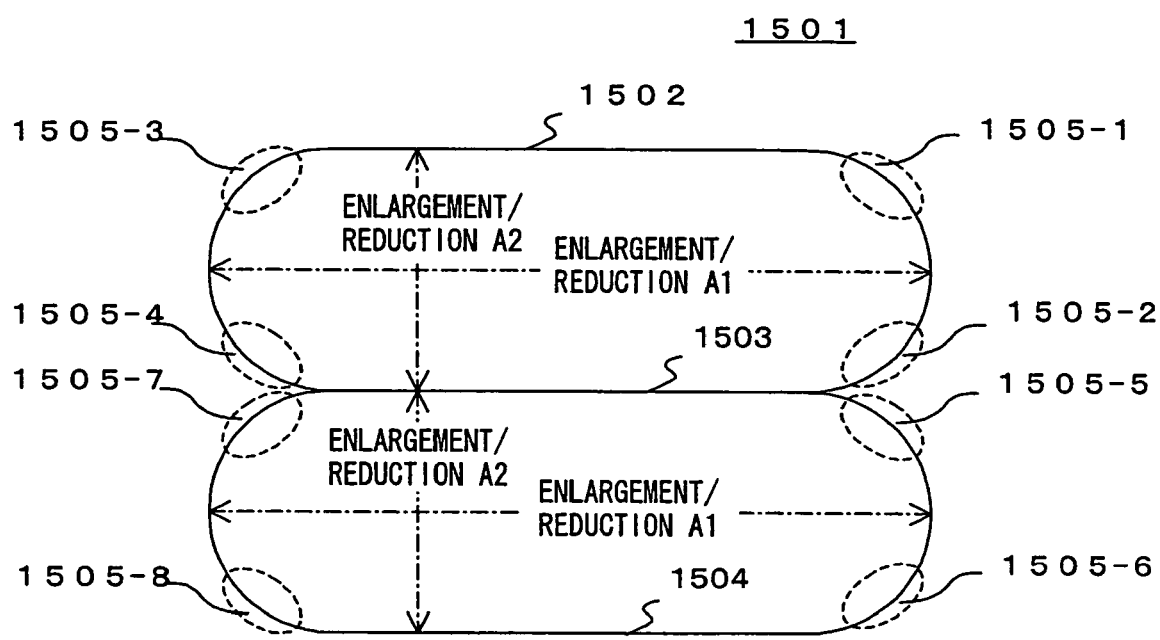
F I G. 1 5

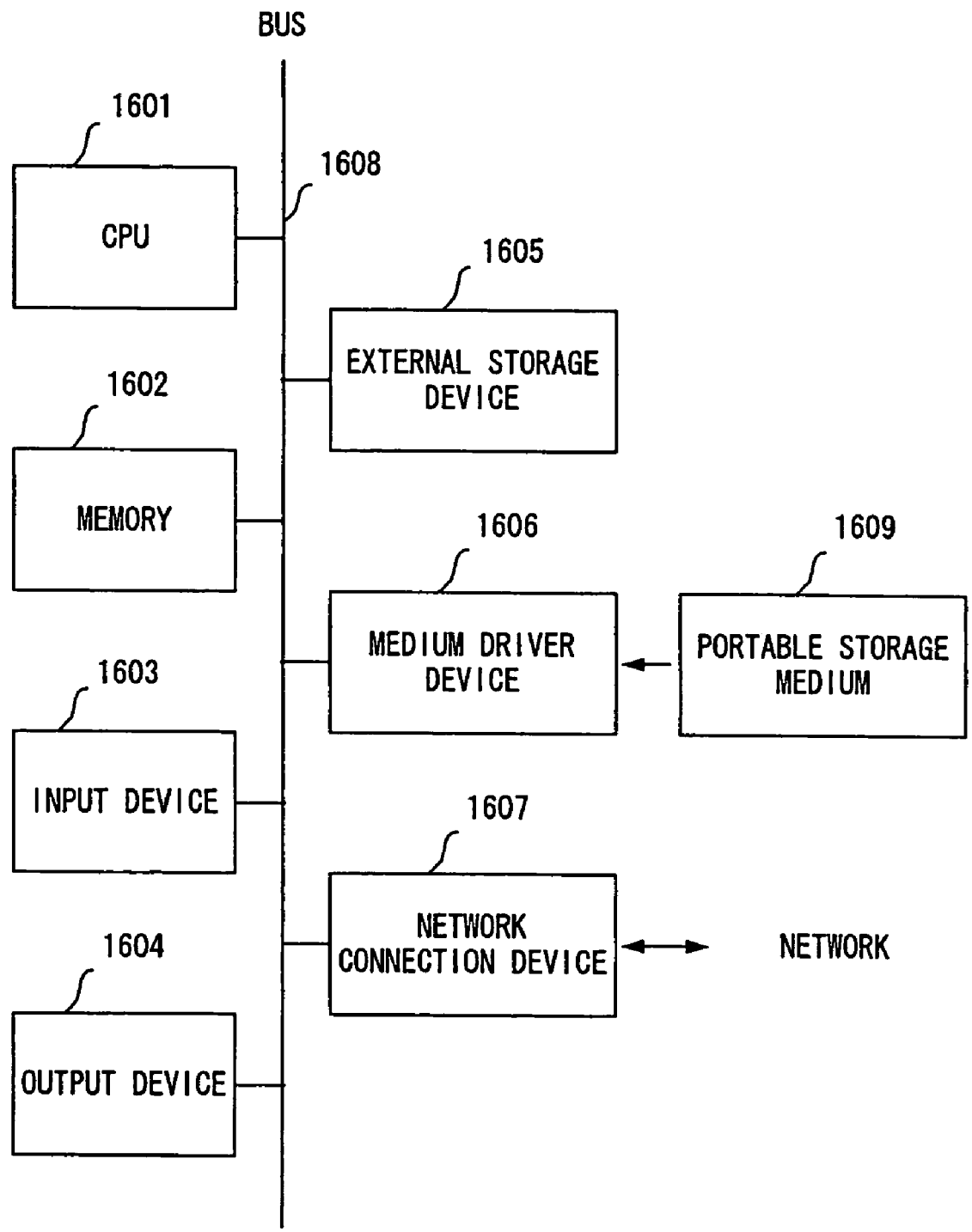
F I G. 1 6

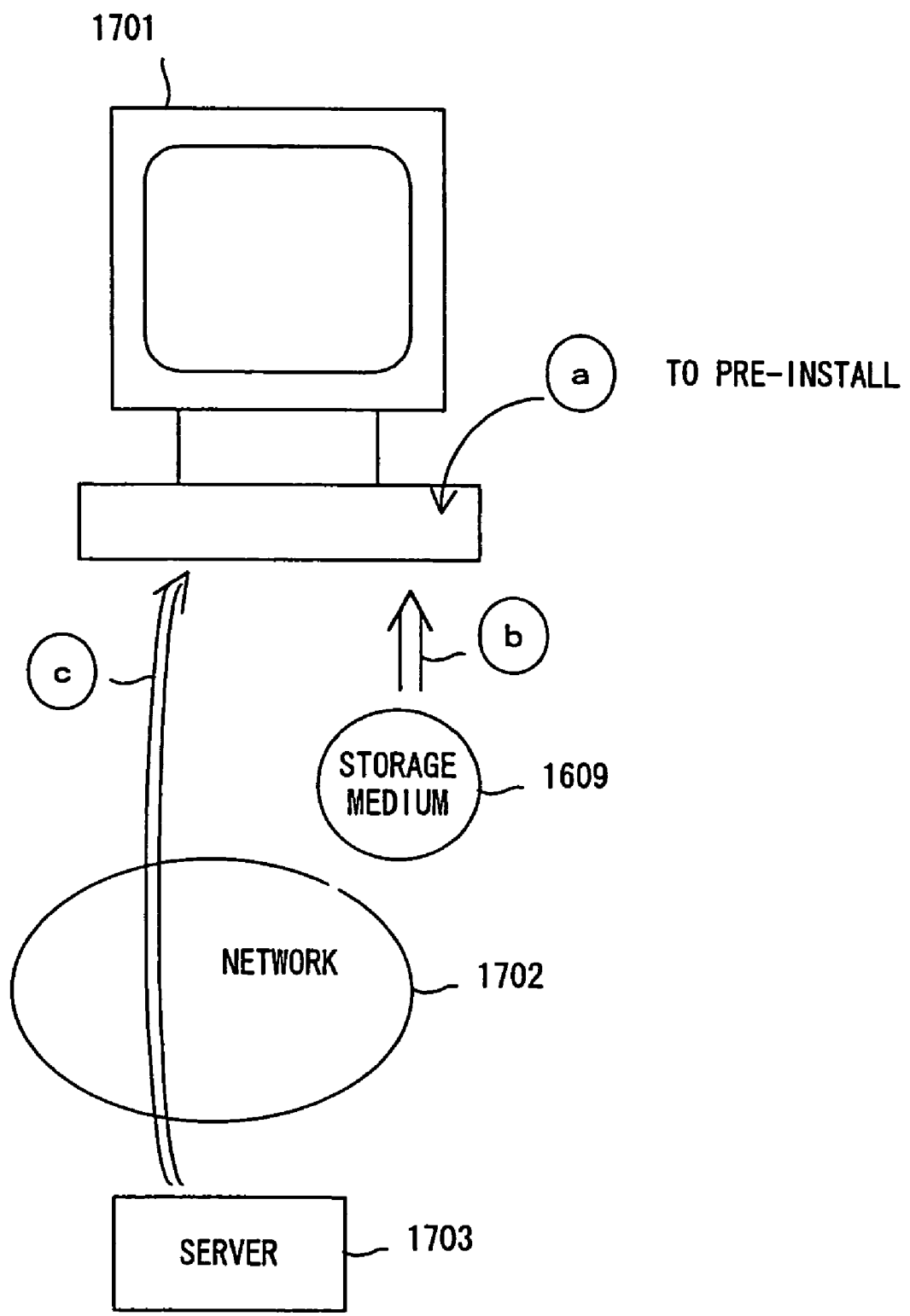
F I G. 17

APPARATUS AND METHOD FOR CORRECTING DISTORTION OF INPUT IMAGE

CROSS REFERENCE TO RELATED APPLICATION

This application is a Continuation of application Ser. No. 09/819,728 filed Mar. 29, 2001 now U.S. Pat. No. 6,970,592, and incorporated by reference herein.

BACKGROUND OF THE INVENTION

1. Field of the Invention

The present invention relates to a correction method of distortion on an input image.

2. Description of the Related Art

Lately, the improvement of a slip recognition technology using an overhead reader (OHR) has been a major problem in financial optical character reader (OCR) business.

An overhead reader is a stand type image input device using a line or area CCD as a camera element as shown in FIG. 1A. Compared with the conventional contact type image input device, such as an image scanner, etc., an OHR has an advantage that by using an OHR, a user can fill in a slip while inputting an image or can input an image while viewing a table in a slip, which leads to comfortable work.

However, compared with an image obtained by a scanner (hereinafter called a "scanner image"), a slip image obtained by an OHR (hereinafter called an "OHR image") has degradation in image quality, such as uneven gradation, shadow, image distortion, etc. The main distortion of an OHR image is three-dimension distortion.

A plurality of pieces of three-dimension distortion of an OHR image are classified into the following three categories.

a) Center-folded distortion: Distortion caused on a slip with a fold at the center. There are two types of center-folded distortion: sunken center-folded distortion and raised center-folded distortion, in which the fold is sunk and raised, respectively. FIGS. 1B and 1C show an example of an OHR image with sunken center-folded distortion and an example of an OHR image with raised center-folded distortion, respectively.

b) Circumference distortion: Distortion caused on the circumference of a slip. There are two types of circumference distortion: sunken circumference distortion and raised circumference distortion in which the fold is sunk and raised, respectively. FIGS. 1D and 1E show an example of an OHR image with sunk circumference distortion and an example of an OHR image with raised circumference distortion, respectively.

c) Pamphlet distortion: Distortion caused in the case of a pamphlet. FIG. 1F shows an example of pamphlet distortion.

In order to use an OHR in financial OCR business, a correction method for overcoming three-dimension distortion in these images must be developed, which is a major problem.

Japanese Patent Laid-open No. 10-150532 discloses a distortion correction method for an OHR image with three-dimension distortion in order to implement high-definition document recognition. This correction method targets one-point stapled distortion caused on a document obtained by stapling several pieces of paper at one point. A plurality of pieces of images photographed from a plurality of top and side viewpoints in order to calculate a three-dimension shape are used to measure three-dimension distortion.

However, since the conventional method for correcting three-dimension distortion uses a plurality of cameras, implementation cost becomes high and wide installation space is required.

SUMMARY OF THE INVENTION

It is an object of the present invention to reduce both implementation cost and installation space by using only one piece of image photographed from the top.

In the present invention, a three-dimension curved-surface model is estimated by using two-dimension outlines obtained from a piece of image photographed from the top as a clue and further using a restriction that a piece of paper is rectangular, and three-dimension distortion in the image is corrected using the calculated three-dimension curved-surface model.

According to the present invention, an outline extraction device comprises a curved-surface estimation device and a distortion correction device. An image obtained by photographing a piece of rectangular paper is used an input image. The outline extraction device extracts the outline of the paper from the input image, and the curved-surface estimation device estimates the three-dimension curved-surface model of the paper using the two-dimension outline as a clue. Then, the distortion correction device corrects the distortion based on the estimated three-dimension curved-surface model and outputs the distortion-corrected image.

Since by adopting such a configuration, an input image is corrected using two-dimension outline distortion obtained from a piece of image as a clue, compared with the conventional technology, one camera is sufficient and as a result, both implement cost and installation space can be reduced.

BRIEF DESCRIPTIONS OF THE DRAWINGS

FIG. 1A shows the appearance of an OHR.

FIG. 2A shows the basic configuration of the present invention.

FIG. 2B shows the configuration of the first preferred embodiment of the present invention.

FIG. 6 shows a linear Coons curved-surface.

FIG. 7 shows a curved coordinate system on a three-dimension curved-surface.

FIG. 9 shows the configuration of the second preferred embodiment of the present invention.

FIG. 15 shows the system adopting the configuration shown in FIG. 14.

FIG. 16 shows the basic configuration of an information processing device.

FIG. 17 shows how a software program, etc., is provided.

DESCRIPTIONS OF PREFERRED EMBODIMENTS

The preferred embodiments of the present invention are described with reference to the drawings.

FIG. 2A shows the basic configuration of the present invention. The apparatus comprises an outline extraction device 101, a curved-surface estimation device 102 and a distortion correction device 103. When an image obtained by photographing a piece of rectangular paper is inputted, the outline extraction device 101 extracts the outline of the paper from the input image, and the curved-surface estimation device 102 estimates the three-dimension curved-surface model of the paper using two-dimension outlines as clues. Then, the distortion correction device 103 corrects the distortion based on the estimated three-dimension curved-surface model and outputs the distortion-corrected image.

Although a shadow is caused due to a fold, etc., on the OHR image of a slip, the acquisition of stable information about the shadow cannot be expected due to the dynamic shadow and uneven gradation of the shadow. Therefore, it is not recommended to use the fluctuation of a shadow as a clue to distortion correction. Therefore, in the present invention shown in FIG. 2A, distortion is corrected using as a clue a slip outline that can be relatively stably obtained. In this method, attention is focussed on the fact that a slip is rectangular, and an image is horizontally/vertically enlarged/reduced using a transformed slip outline as a clue. The method can be said one type of "shape from contour" methods. The feature of this method is that the curved-surface estimation device 102 estimates a three-dimension curved-surface model from a piece of distorted image using two-dimension outline distortion. Since one camera is sufficient, implementation cost can be greatly reduced. Furthermore, since both shadow fluctuation and slip outline distortion that can be relatively stably extracted are used as clues, high-definition distortion correction can be implemented.

Figure 1B:
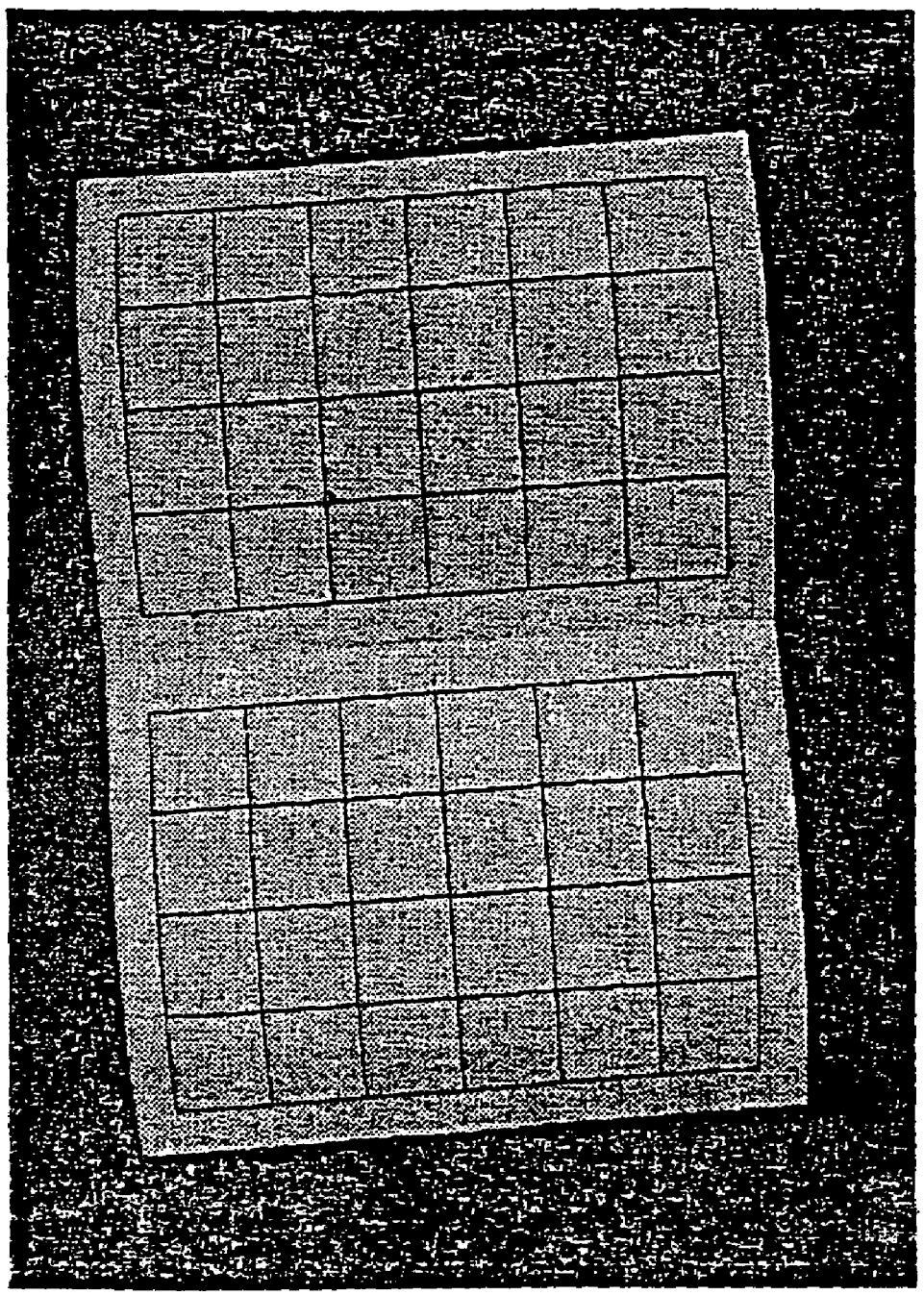
FIG. 1B shows an example of a sunken center-folded OHR image.

FIG. 2B shows the configuration of the first preferred embodiment of the present invention. The distortion correction method shown in FIG. 2B corrects the sunken center-folded distortion of a plurality of pieces of distortion caused on a slip with a fold at the center. As shown in FIG. 1B, in a sunken center-folded OHR image, the top outline, bottom outline and a center-folded outline can be recognized as line segments touching a reference plane, such as a table, etc. Sometimes the left outline, right outline and center-folded outline are recognized as line segments depending on how to place a slip. However, in such a case, if the image is rotated 90 degrees, the same situation as described above can be obtained. Therefore, the first preferred embodiment that corrects sunken center-folded distortion is described in detail below using as an example the case where the top outline, center-folded outline and bottom outline can be recognized as line segments.

In FIG. 2B, when an image obtained by photographing a piece of rectangular paper is inputted, an outline extraction device 201 extracts the outline of the paper from the input image, and a sunken center-folded curved-surface estimation device 202 estimates a three-dimension curved-surface model using the outline distortion of a sunken center-folded slip as a clue. Then, a distortion correction device 203 corrects the distortion based on the estimated three-dimension curved-surface model of the paper and outputs the distortion-corrected image.

The outline extraction device 201 first designates outlines obtained by edge extraction, such as Sobel's edge extraction, etc., as outline pixel candidates and judges whether each outline pixel candidate constitutes the outline. The outline extraction device 201 can also be designed to extract and to use not only a paper outline obtained by edge extraction, but also a straight line (horizontal/vertical), a character string that are provided in a piece of paper.

Figure 3:
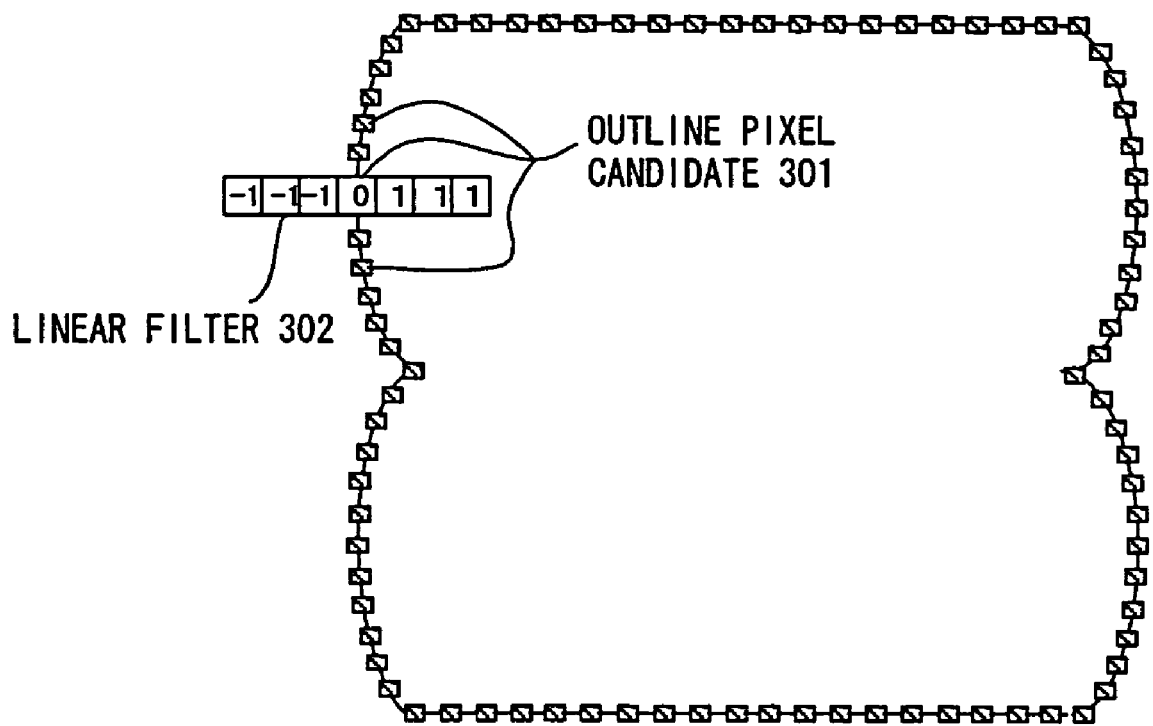
FIG. 3 shows how to evaluate outline likeliness in the outline extraction device.

A case where it is judged whether a target pixel in an aggregate of extracted outline pixel candidates constitutes, for example, the left outline (see FIG. 3). If a specific pixel constitutes the left outline, the left side of the pixel is a pixel string with a low pixel value, such as a background color and the right side is a pixel string with a high pixel value, such as white. Therefore, for example, if the product sum of a linear filter 302 (−1, −1, −1, 0, 1, 1, 1) and an outline pixel 301 is calculated, the product sum value becomes large. Therefore, it is all right if a specific threshold value is pre-determined and it is judged that an outline pixel candidate with a product sum larger than the threshold value is an outline pixel. In this way, the left outline is determined by calculating the product sum of the linear filter 302 and each outline pixel candidate and by comparing the obtained product sum with the threshold value.

Similarly, in the case of the right outline, it is all right if a linear filter (1, 1, 1, 0, −1, −1, −1) with a configuration the reversal of the left outline is used. The top/bottom outline can also be determined in the same way.

A linear filter can have arbitrary peculiar vector that is horizontally/vertically symmetric with 0 at the center. Specifically, the filter can have peculiar vector in which n arbitrary constants k and −k arrayed with 0 at the center (k, k, . . . , k, 0, −k, −k, . . . , −k).

Figure 4:
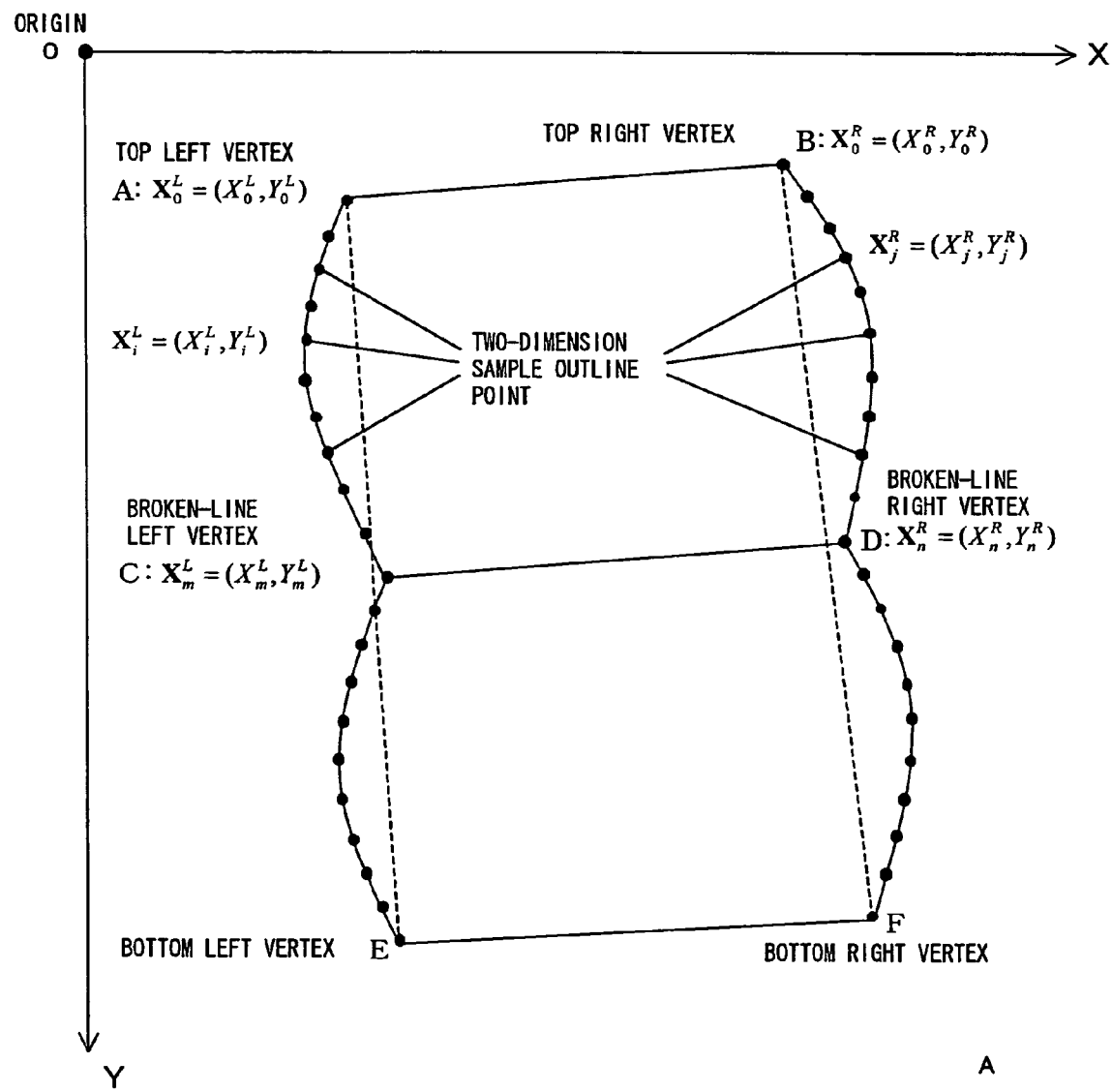
FIG. 4 shows outline lines, outline vertexes and sample outline points.

As described above, the outline extraction device 201 outputs a binary outline image. Furthermore, the outline extraction device 201 also extracts outline vertexes and sample outline points. Since an outline line, an outline vertex and an sample outline point are all related to an outline in a two-dimension image, it is hereinafter called as a two-dimension outline line, a two-dimension outline vertex and a two-dimension sample outline point, respectively, by attaching "two-dimension" to the respective heads in order to distinguish them from slip outlines in a three-dimension image. FIG. 4 shows expressions based on a two-dimension coordinates of an two-dimension outline line, an two-dimension outline vertex and an two-dimension sample outline point that are obtained by the outline extraction device 201.

A two-dimension outline vertex can be obtained by horizontally following an outline line from an outline point around the center of the top outline AB or bottom outline EF shown in FIG. 4 and searching for outline points, the inclination of which suddenly change (top left outline vertex A, top right outline vertex B, lower left outline vertex E and lower right outline vertex F). The left/right vertexes of a center-folded outline (slip center) are extracted according to the location relationship with a rectangle ABFE that is obtained by connecting outline vertexes A, B, E and F by line segments. In the case of a sunken center-folded slip, left/right outline points that deepest enter into the rectangle are designated as sunken center-folded outline vertexes (broken-line left vertex C and broken-line right vertex D).

Furthermore, a two-dimension sample outline point used to apply segment linear approximation to extracted left/right outline lines can be obtained by selecting them at predetermined equal intervals towards the Y axis shown in FIG. 4.

In the following description, the same expressions of each point, line segment, outline lines, etc., based on a two-dimension coordinates as those in FIG. 4 are used.

Next, the sunken center-folded curved-surface estimation device 202 is described. The sunk center-folded curved-surface estimation device 202 calculates the coordinates of the three-dimension sample outline point of a sunk center-folded slip assuming that the point is an intersection point of a line segment connecting obtained two-dimension sample outline point and a camera center, which is the viewpoint of an input image, (since a stand type OHR is used, a camera center is predetermined) and a plane that passes through a line connecting two two-dimension outline vertexes and that is perpendicular to the reference plane. The device 202 designates a broken line obtained by connecting the calculated three-dimension sample outline points as an outline line and estimates a curved-surface obtained by applying linear interpolation approximation to the outline line, as the three-dimension curved-surface model of a distorted slip curved-surface.

A sunken center-folded curved-surface can be horizontally divided into two curved surfaces with a center-folded outline (line segment touching the reference plane of the slip center) as a boundary. The process of the sunken center-folded curved-surface estimation device 202 is described in detail below limiting the process to the upper curved-surface. As for the lower curved-surface, the same description applies.

Figure 5:
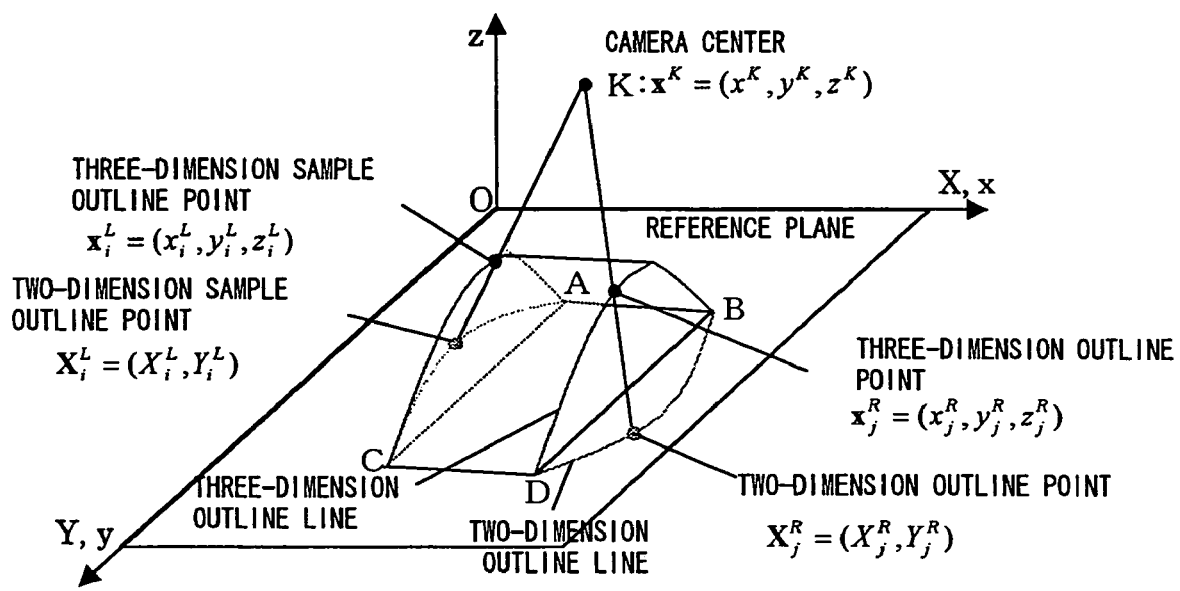
FIG. 5 shows the location relationship among a camera center, a two-dimension outline and a three-dimension outline in a (upper) sunken center-folded curved-surface model.

FIG. 5 shows the location relationship among a camera center, a two-dimension outline and a three-dimension outline. The meanings of symbols shown in FIG. 5 are as follows.

x: Three-dimension vector
X: Two-dimension vector
x,y,z: Three-dimension coordinate value
X,Y: Two-dimension coordinate value
L: Left
R: Right
i: Suffix of a left outline point, i=0, . . . ,m
j: Suffix of a right outline point, j=0, . . . ,n A point on a three-dimension outline that is related to a two-dimension sample outline point by perspective conversion is called a three-dimension sample outline point. The coordinates of both a camera center and a three-dimension sample outline point are assumed to be expressed as shown in FIG. 5. The coordinates of a three-dimension sample outline point on the left outline line are calculated as follows.

A three-dimension sample outline point on the three-dimension left outline line corresponding to a two-dimension sample outline point on the two-dimension left outline line can be calculated as an intersection point of a line segment connecting a camera center and the two-dimension sample outline point, and a plane that pass through a line segment AC connecting left outline vertexes A and C and that is perpendicular to xy plane.

The equation (1) of a plane perpendicular to xy plane, including line segment AC can be expressed as follows.

$$y - Y_0^L = \frac{Y_m^L - Y_0^L}{X_m^L - X_0^L} \cdot (x - X_0^L) \qquad (1)$$

where A: $(X_0^L, Y_0^L)$ and C: $(X_m^L, Y_m^L)$.

If it is assumed that a three-dimension sample outline point is a point where a line segment connecting the camera center and two-dimension sample outline point is internally divided at a ratio of (1-t): t, the following equation (2) holds true.

$$\begin{cases} x_i^L = X_i^L + (x^K - X_i^L)t \\ y_i^L = Y_i^L + (y^K - Y_i^L)t \\ z_i^L = z^K t \end{cases} \qquad (2)$$

However, in the above equation,
Three-dimension sample outline point: $x_i^L = (x_i^L, y_i^L, z_i^L)$
Camera center K: $(x^K, y^K, z^K)$
Two-dimension sample outline point: $X_i^L = (X_i^L, Y_i^L)$.

If t is solved from equation (1) and (2), the following equation (3) is obtained.

$$t = \frac{(X_m^L - X_i^L)(Y_0^L - Y_m^L) - (Y_m^L - Y_i^L)(X_0^L - X_m^L)}{(x^K - X_i^L)(Y_0^L - Y_m^L) - (y^K - Y_i^L)(X_0^L - X_m^L)} \qquad (3)$$

If t obtained according to equation (3) is assigned to equation (1) and (2), the coordinates of each three-dimension sample outline point on the left outline line can be calculated.

The coordinates of a three-dimension sample outline point on the right outline can also be calculated in the same way.

Broken lines obtained by connecting the three-dimension sample outline points with a line segment are designated as the left/right outline lines, and a curved surface obtained by applying linear interpolation approximation to these outlines is designated as the three-dimension curved-surface model of a distorted slip.

For the linear interpolation approximation, for example, an interpolation method, such as linear Coons interpolation, etc., can be used. Linear Coons interpolation means to interpolate space between four three-dimension outlines with line segments if there is assumed to be four three-dimension outlines. A linear Coons curved-surface, to which linear Coons interpolation is applied, is a kind of parametric spatial curved-surface that is defined by a curved coordinate system (u, w). If it is assumed that a curved surface is surrounded by four curved surfaces P(u, 0), P(u, 1), P(0, w) and P(1, w), the coordinates Q(u, w) of a point on the curved surface can be expressed by the following equation (4) using an outline curve expression (see FIG. 6). A curved surface obtained according to equation (4) is designated as a three-dimension curved-surface model.

$$Q(u, w) = P(u, 0)(1 - w) + P(u, 1)w + \qquad (4)$$

-continued
$$P(0, w)(1-u) + P(1, w)u - P(0, 0)(1-u)(1-w) -$$
$$P(0, 1)(1-u)w - P(1, 0)u(1-w) - P(1, 1)uw$$

Although as a method for calculating a three-dimension outline model in the sunken center-folded curved-surface estimation device 202, a method in which points scattered on a three-dimension outline line are designated as three-dimension sample outline points and the height or corresponding value of each three-dimension sample point is used as a model parameter, is described, a method for calculating a three-dimension outline model is not limited to this. Specifically, for example, for the three-dimension outline model, a curved model with a parameter, such as a spline curve, a Bezier curve, etc., can also be used.

A spline curve and a Bezier curve are parametric spatial curves. Generally, a parametric spatial curve is expressed by the following equation (5).

$$\begin{cases} x = x(t) \\ y = y(t) \\ z = z(t) \end{cases} \quad (5)$$

However, in the above equation, t is a parameter and (x, y, z) is the coordinates of a point on a three-dimension spatial curve. According to equation (5), a spline curve is expressed by the following expression (6).

$$\begin{cases} x(t) = \sum_{i=1}^{4} B_i^x t^{i-1} \\ y(t) = \sum_{i=1}^{4} B_i^y t^{i-1} \\ z(t) = \sum_{i=1}^{4} B_i^z t^{i-1} \end{cases} \quad (6)$$

Similarly, according to equation (5), a Bezier curve is expressed by the following equation (7).

$$\begin{cases} x(t) = \sum_{i=1}^{4} B_i^x J_i^n(t) \\ y(t) = \sum_{i=1}^{4} B_i^y J_i^n(t) \\ z(t) = \sum_{i=1}^{4} B_i^z J_i^n(t) \end{cases} \quad (7)$$

However, in the above equation, $$J_i^n(t) = \binom{n}{i} t^i (1-t)^{n-i},$$
$$\binom{n}{i} = \frac{n!}{i!(n-i)!}.$$

Since both a spline curve and a Bezier curve can be expressed by parameter t, a three-dimension outline model can be calculated using this parameter t as a model parameter.

Furthermore, a center-folded curved-surface estimation device (or curved-surface estimation device) can be designed to estimate a three-dimension curved surface in the same way by using information about a straight line (vertical/horizontal), a character string (vertical/horizontal) that are provided in a piece of paper, instead of outline lines.

Next, the distortion correction device 203 is described. The distortion correction device 203 obtains an image after correction, with the length of top/bottom outlines and the length of left/right outlines as width and height, respectively, by calculating a location in an input image corresponding to each pixel of an image after correction using a curved coordinate system with an outline line as each coordinate axis, and by setting the value (binary, gradation or color) of a corresponding pixel in the input image as the target pixel value of the image after correction.

In the case of a center-folded slip, both the top/bottom outline lines are obtained as line segments connecting outline vertexes. Both the left/right outline lines are obtained as broken lines connecting three-dimension sample outline points obtained by the sunken center-folded curved-surface estimation device 202. A center-folded outline is obtained as a line segment connecting three-dimension sample outline points obtained by the sunken center-folded curved-surface estimation device 202.

The center-folded slip is horizontally divided and distortion is corrected by setting a curved coordinate system on each corresponding three-dimension curved surface. A distortion correction method for the upper three-dimension curved surface is described below. The same process can also be applied to the lower curved surface.

The top and left outline lines are assigned to X and Y axes, respectively, using the top left outline vertex (point A shown in FIG. 4) as an origin. For the width W of an image after correction, the average value of the top outline line length and the center-folded outline line length is used, and for the and height H of the image, the average value of the left outline line length and the right outline line length is used. Specifically, the width W and height H are calculated according to the following equation (8) and (9), respectively.

$$W = \frac{1}{2}(AB + cd) \quad (8)$$

$$H = \frac{1}{2}(Ac + Bd) \quad (9)$$

Three-dimension coordinates are calculated by relating point L(Y) on the left outline line to Y with an integer value between 0 and height H in order to graduate Y coordinates on the left outline line. The three-dimension coordinates of L(Y) are calculated by following a broken line connecting three-dimension sample outline points representing the left outline line from the top left outline vertex and proceeding by length (H/Ac) at one time.

Similarly, three-dimension coordinates are obtained by relating R(Y) on the right outline line to Y with an integer value between 0 and height H. The three-dimension coordinates of R(Y) are calculated by following a broken line connecting three-dimension sample outline points representing the right outline line from the top right outline vertex and proceeding by length (H/Bd) at one time. It can be considered that a curved coordinate system is expressed by both L(Y) and R(Y) (see FIG. 7).

Then, the gradation G(X, Y) (0≦X≦W, 0≦Y≦H) of a pixel corresponding to the two-dimension coordinates (X, Y) of an image after distortion correction are calculated by defining a curved coordinate system in this way.

A point corresponding to corrected two-dimension coordinates (X, Y) is point P with two-dimension curved coordinates (X, Y) on a three-dimension curved surface. It is assumed that the three-dimension coordinates of point P are expressed by the following expression (10).

$$x^P = (x^P, y^P, z^P) \qquad (10)$$

Point P is a point obtained by applying linear interpolation to both point L(Y) on the left outline line and R(Y) on the right outline line and it can be expressed as a point obtained by internally dividing line segment L(Y)R(Y) at a ratio of X/W:(1−X/W). Therefore, the three-dimension coordinates of point P can be calculated according to the following equation (11).

$$x^P = (x^P, y^P, z^P) = \left(1 - \frac{X}{W}\right)L(Y) + \frac{X}{W}R(Y) \qquad (11)$$

Then, the two-dimension coordinates of an intersection point of a straight line that starts from the camera center and passes through point P, and xy reference plane is calculated. The coordinates can be calculated according to equation (12) depending on perspective conversion conditions.

$$\tilde{P} = (\tilde{X}, \tilde{Y}) = \left(\frac{x^P z^K - x^K z^P}{z^K - z^P}, \frac{y^P z^K - y^K z^P}{z^K - z^P}\right) \qquad (12)$$

$\tilde{P}$ is the intersection point of a straight line passing through both the camera center and point P, and xy reference plane.

Therefore, the gradation G(X, Y) of an image after correction can be calculated according to the following equation (13).

$$G(X, Y) = \tilde{G}\left(\left[\tilde{X} + \frac{1}{2}\right], \left[\tilde{Y} + \frac{1}{2}\right]\right) \qquad (13)$$

$$= \tilde{G}\left(\left[\frac{x^P z^K - x^K z^P}{z^K - z^P} + \frac{1}{2}\right], \left[\frac{y^P z^K - y^K z^P}{z^K - z^P} + \frac{1}{2}\right]\right)$$

However, in the above equation, $\tilde{G}(\hat{X}, \hat{Y})$ indicates the gradation value of a pixel with the two-dimension coordinates $(\hat{X}, \hat{Y})$ of an image before correction.

[x] is Gauss symbol and indicates the largest integer not exceeding x.

However, in equation (13), the two-dimension coordinates of the intersection point of a straight line that starts from the camera center and passes through point P, and xy reference plane are rounded by counting fractions of 5 and over as a unit and disregarding the rest since it is a real number.

Figure 8:
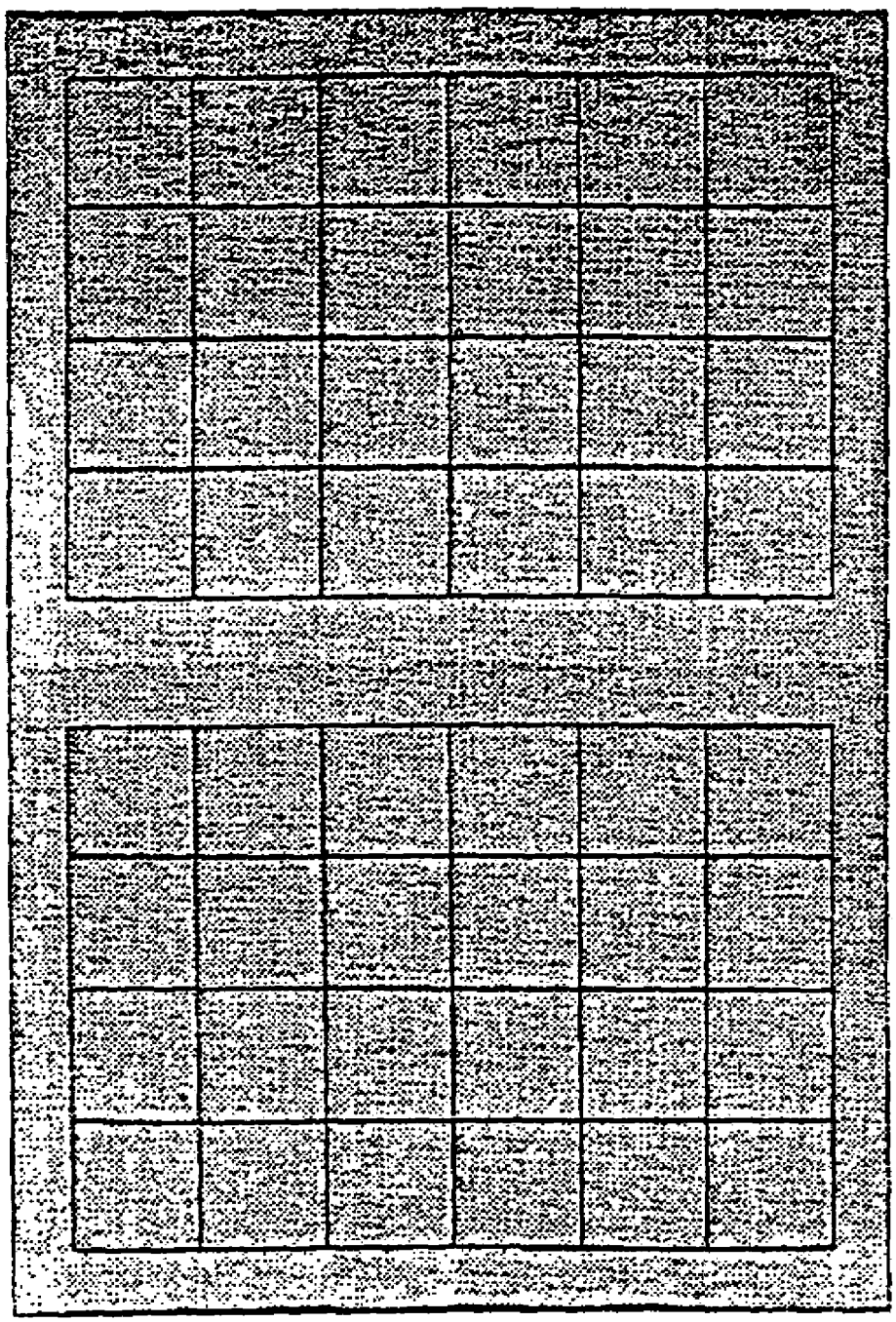
FIG. 8 shows the correction result of sunken center-folded distortion.

FIG. 8 shows the correction result of a sunken center-folded distorted OHR image processed according to the first preferred embodiment of the present invention described above. FIG. 8 shows the correction of the image shown in FIG. 1B. In this way, according to the first preferred embodiment of the present invention, a sunken center-folded distorted OHR image can be successfully corrected.

Figure 1C:
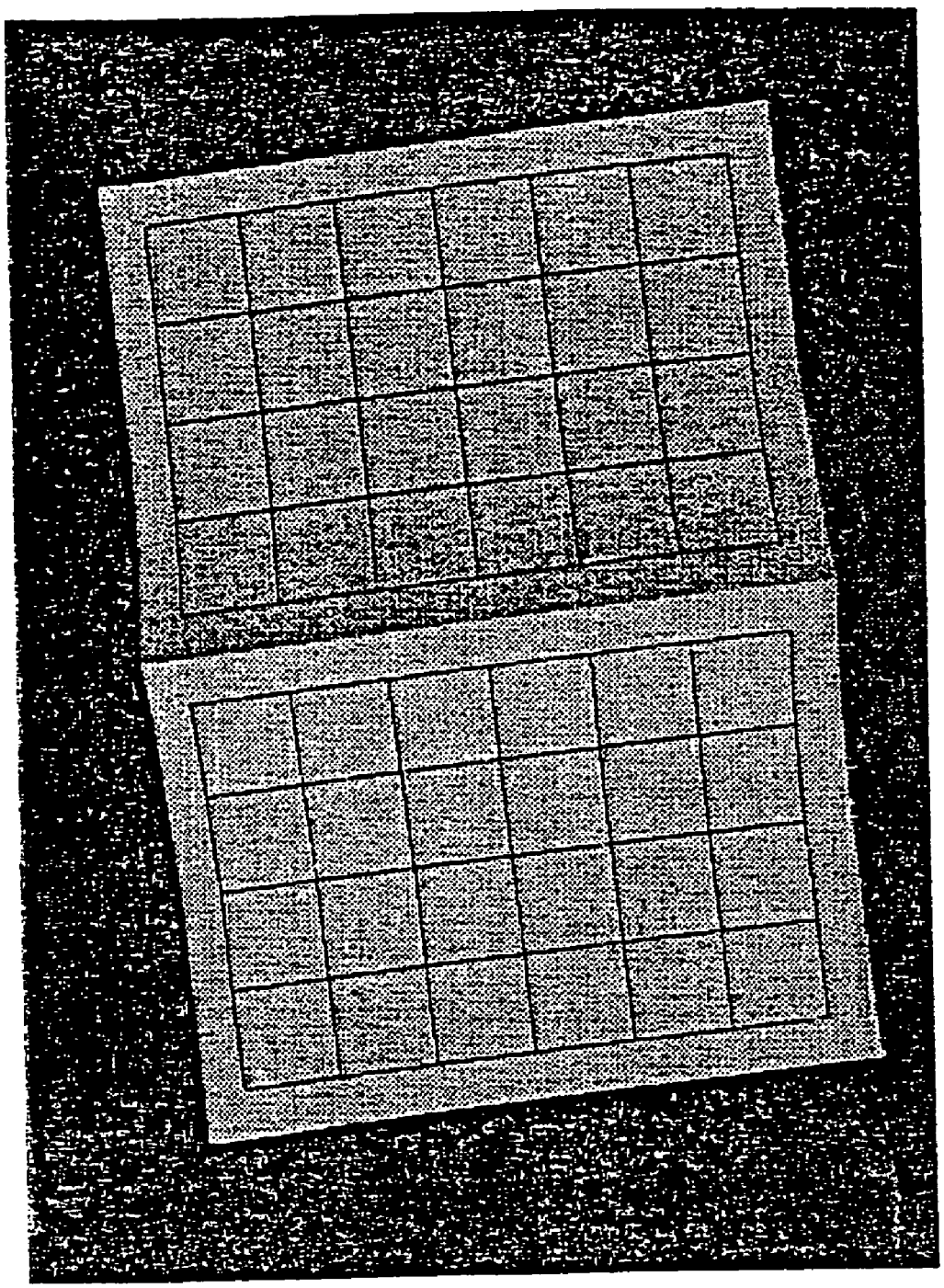
FIG. 1C shows an example of a sunken center-folded OHR image.

FIG. 9 shows the configuration of the second preferred embodiment of the present invention. The distortion correction method shown in FIG. 9 is used to correct a raised center-folded distortion of a plurality of pieces of distortion caused on a center-folded slip. As shown in FIG. 1C, although in a raised center-folded distorted OHR image, the top/bottom outlines of a slip touch a reference plane, such as a table, the center-folded outline is raised beyond the reference plane as not in a sunk center-folded distortion targeted in the first preferred embodiment. Sometimes the left outline, right outline or center-folded outline is recognized as a line segment. In this case, if the image is rotated 90 degrees, the same description applies. Therefore, the second preferred embodiment for correcting a raised center-folded distortion correction is described in detail below using as an example the case where the top, center-folded or bottom outline line is recognized as a line segment.

In FIG. 9, when an image obtained by photographing a piece of rectangular paper is inputted, an outline extraction device 901 extracts the outline of the paper, and a raised center-folded curved-surface estimation device 902 estimates a three-dimension curved-surface model using the outline distortion of a raised center-folded slip as a clue. Then, a distortion correction device 903 corrects the distortion based on the three-dimension curved-surface model of the paper and outputs the distortion-corrected image.

In almost the same way as the outline extraction device 201 described in the first preferred embodiment, the outline extraction device 901 calculates the product sum of an edge-extracted outline pixel candidate and a linear filter after edge extraction and determines an outline pixel based on the calculated product sum value. Two-dimension outlines, two-dimension outline vertexes and two-dimension sample outline points are also extracted.

In this case, in order to extract the left/right vertexes of a center-folded outline (slip center), the left/right outline points that are farthest away from the rectangle are extracted as raised center-folded outline vertexes as not in the case of a sunken center-folded slip.

Figure 10:
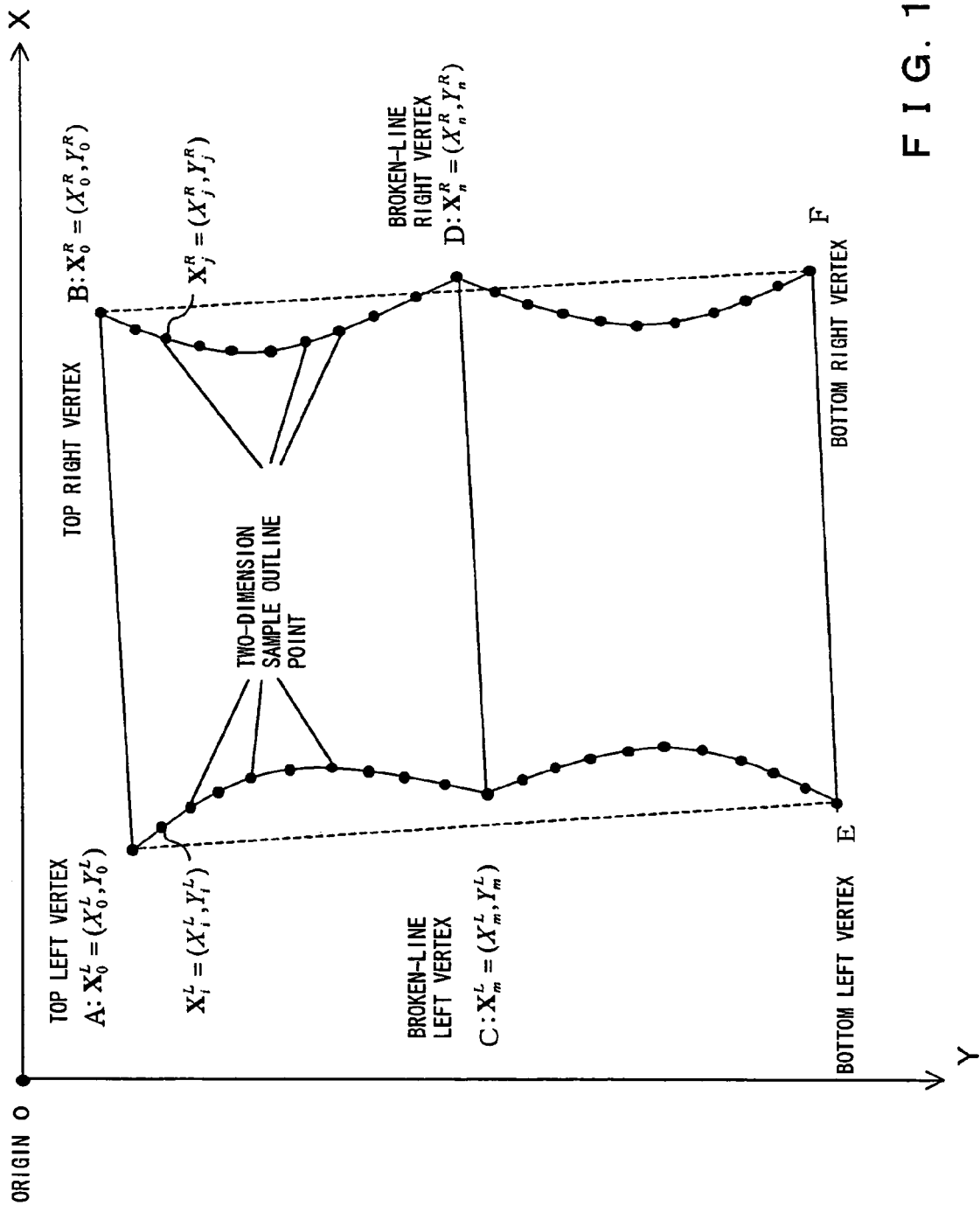
FIG. 10 shows outline lines, outline vertexes and sample outline points.

The outline extraction device 901 extracts two-dimension outline lines, two-dimension sample outline points and two-dimension outline vertexes based on the two-dimension coordinates shown in FIG. 10. In the following description, the same expressions of each point, a line segment, an outline line, etc., based on two-dimension coordinates as shown in FIG. 10 are used.

Next, the raised center-folded curved-surface estimation device 902 is described. In the raised center-folded curved-surface estimation device 902, the value equivalent to the height of the center-folded outline vertex at the center is designated as the two-dimension model parameter of a raised center-folded slip with the top/bottom outlines, the height from a reference plane is zero and the center-folded outline at the center, the height of which is unknown. Then, an energy function with a restriction that the length of the top three-dimension outline is the same as length of lower three-dimension outline and that the length of the left three-dimension outline is the same as the length of right three-dimension outline, is expressed using the model parameter. In order to minimize and optimize this energy function, an optimal model parameter is calculated by a repetition method, etc. A three-dimension curved-surface model is estimated by calculating the coordinates of each three-dimension sample outline point using the calculated model parameter. A method for calculating the model parameter is described below.

Since a raised center-folded curved surface can be horizontally divided with the center-folded outline (slip center) as a boundary, the process of the raised center-folded curved-surface estimation device 902 is described in detail using the upper curved surface as an example.

Figure 11:
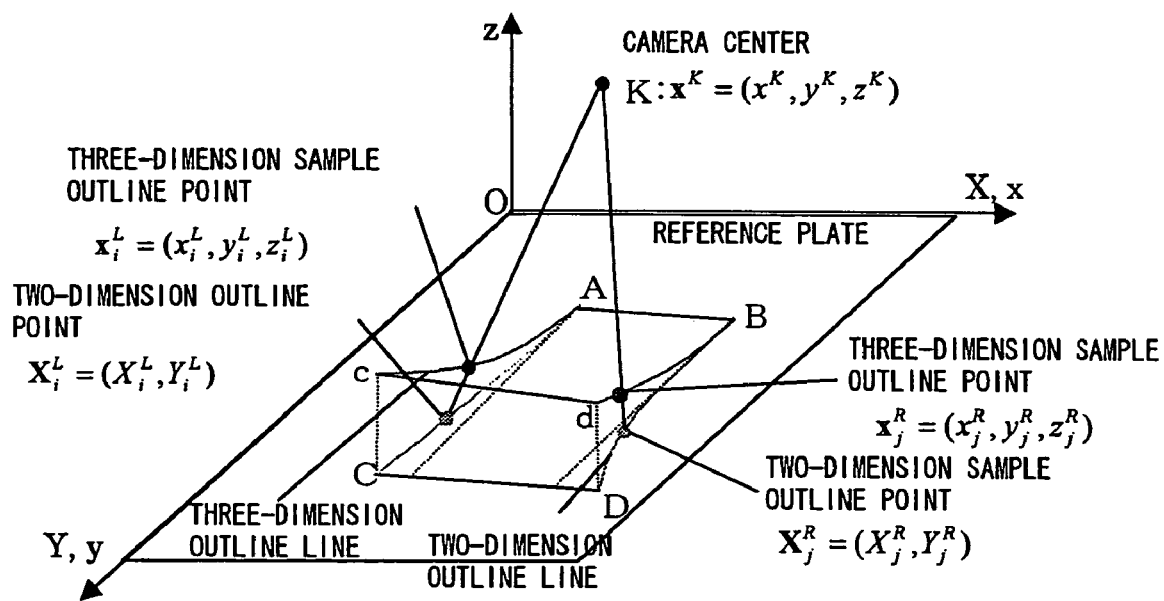
FIG. 11 shows the location relationship among a camera center, a two-dimension outline and a three-dimension outline in a (upper) raised center-folded curved-surface model.

FIG. 11 shows the location relationship among the camera center, a two-dimension outline and a three-dimension outline. The meaning of each symbol used in FIG. 11 is the same as that of External character line 1. A point on a three-dimension outline line that is related to a two-dimension sample outline point by perspective conversion is called a three-dimension sample outline point. FIG. 11 shows the coordinates of both the camera center and three-dimension sample outline point.

If the followings are assumed,
three-dimension sample outline point: $x_i^L = (x_i^L, y_i^L, z_i^L)$
camera center K: $(x^K, y^K, z^K)$
two-dimension sample outline line: $X_i^L = (X_i^L, Y_i^L)$ and if three-dimension sample outline point $x_i^L$ internally divides a line segment $KX_i^L$ connecting camera center K and two-dimension sample outline point at a ratio of $(1-s_i):s_i$, the following equation (14) can be obtained.

$$\begin{cases} x_i^L = X_i^L + (x^K - X_i^L)s_i \\ y_i^L = Y_i^L + (y^K - Y_i^L)s_i \\ z_i^L = z^K s_i \end{cases} \quad (14)$$

If the followings are assumed,
three-dimension sample outline point: $x_j^R = (x_j^R, y_j^R, z_j^R)$
camera center K: $(x^K, y^K, z^K)$
two-dimension sample outline line: $X_j^R = (X_j^R, Y_j^R)$ and if three-dimension sample outline point $x_j^R$ internally divides a line segment $KX_j^R$ connecting camera center K and two-dimension sample outline point at a ratio of $(1-t_j):t_j$, the following equation (15) can be obtained.

$$\begin{cases} x_j^R = X_j^R + (x^K - X_j^R)t_j \\ y_j^R = Y_j^R + (y^K - Y_j^R)t_j \\ z_j^R = z^K t_j \end{cases} \quad (15)$$

The coordinates of the three-dimension left vertex c and right vertex d on a raised center-folded outline can be expressed by the following equation (16) and (17), respectively. If the internal division ratio of a line segment connecting these two points is determined, the coordinates of each three-dimension sample outline point can be calculated on conditions that each three-dimension sample outline point is on a line segment connecting camera center K and a two-dimension sample outline point, and is on a plane that includes a line segment Ac or Bd and is perpendicular to xy plane.

$$x_m^L = (x_m^L, y_m^L, z_m^L) \quad (16)$$

$$x_n^R = (x_n^R, y_n^R, z_n^R) \quad (17)$$

Therefore, it can be said that the internal division ratio between three-dimension left vertex c and right vertex d is the two-dimension model parameter of the three-dimension model of a slip curved-surface.

The corresponding internal division ratio of the left outline line can be calculated on the conditions for three-dimension sample outline line described above using a model parameter according to the following equation (18) if the followings are assumed,
the internal division ratio of a three-dimension sample outline point: $S_i$
model parameter (internal division ratio of a three-dimension left vertex): $s_m$.

$$s_i = \frac{\alpha_i^L s_m + \beta_i^L}{\chi_i^L s_m + \delta_i^L} \quad (18)$$

However, in the above equation, values $\alpha_i^L$, $\beta_i^L$, $\chi_i^L$ and $\delta_i^L$ are calculated as follows.

$$\alpha_i^L = (x^K - X_m^L)(Y_0^L - Y_i^L) - (X_0^L - X_i^L)(y^K - Y_m^L)$$

$$\beta_i^L = (Y_0^L - Y_i^L)X_m^L - (X_0^L - X_i^L)Y_m^L + (X_0^L Y_i^L - X_i^L Y_0^L)$$

$$\chi_i^L = (x^K - X_m^L)(y^K - Y_i^L) - (x^K - X_i^L)(y^K - Y_m^L)$$

$$\delta_i^L = (x^K - X_i^L)(Y_0^L - Y_m^L) - (y^K - Y_i^L)(X_0^L - _m^L)$$

Similarly, the corresponding internal division ratio of the right outline line can be calculated on the conditions for a three-division sample outline point using a model parameter according to the following equation (19) if the followings are assumed,
the internal division ratio of a three-dimension sample outline point: $t_j$
model parameter (internal division ratio of a three-dimension left vertex): $t_n$.

$$t_j = \frac{\alpha_j^R t_n + \beta_j^R}{\chi_j^R t_n + \delta_j^R} \quad (19)$$

However, in the above equation, values $\alpha_j^R$, $\beta_j^R$, $\chi_j^R$, and $\delta_j^R$ are calculated as follows.

$$\alpha_j^R = (x^K - X_n^R)(Y_0^R - Y_j^R) - (X_0^R - X_j^R)(y^K - Y_n^R)$$

$$\beta_j^R = (Y_0^R - Y_j^R)X_n^R - (X_0^R - X_j^R)Y_n^R + (X_0^R Y_j^R - X_j^R Y_0^R)$$

$$\chi_j^R = (x^K - X_n^R)(y^K - Y_j^R) - (x^K - X_j^R)(y^K - Y_n^R)$$

$$\delta_j^R = (x^K - X_j^R)Y_0^R - Y_n^R) - (y^K - Y_j^R)(X_0^R - X_n^R)$$

The minimization and optimization of energy function E expressing a restriction that three-dimension top/bottom outline lines are the same in length, and three-dimension left/right outline lines are the same in length, can be formulated and an optimal model parameter can be calculated, for example, by a repetition method as described later.

Energy function E is defined by the linear sum of the squared difference in length between top outline line AB and raised center-folded outline line cd, and the squared difference in length between left outline line Ac and right outline line Bd. The value of energy function E is uniquely determined by an internal division ratio, which is the model parameter of a slip curved-surface. Therefore, energy function E can be expressed by the following equation (20).

$$E(s_m, t_n) = k_1 E_1 + k_2 E_2 = k_1 (AB - cd)^2 + k_2 (Ac - Bd)^2 \quad (20)$$

where $k_1$ and $k_2$ are constants (for example, $k_1=1$ and $k_2=1$).

Since both the top outline line (line segment AB) and a raised center-folded outline line (line segment cd) are line segments, they can be calculated from the length of three-dimension vertex coordinates according to the following equation (21) and (22), respectively.

$$AB = \sqrt{(X_0^L - X_0^R)^2 + (Y_0^L Y_0^R)^2} \quad (21)$$

$$cd = \sqrt{(x_m^L - x_n^R)^2 + (y_m^L - y_n^R)^2 + (z_m^L - z_n^R)^2} \quad (22)$$

The length of the left outline line Ac and that of the right outline line Bd are approximated by the respective sum of the length of line segments connecting three-dimension sample outline points. Specifically, they can be calculated according to the following equation (23) and (24), respectively.

$$Ac = \sum_{i=0}^{m-1} \|x_{i+1}^L - x_i^L\| \quad (23)$$

$$= \sum_{i=0}^{m-1} \sqrt{(x_{i+1}^L - x_i^L)^2 + (y_{i+1}^L - y_i^L)^2 + (z_{i+1}^L - z_i^L)^2}$$

$$Bd = \sum_{j=0}^{n-1} \|x_{j+1}^R - x_j^R\| \quad (24)$$

$$= \sum_{j=0}^{n-1} \sqrt{(x_{j+1}^R - x_j^R)^2 + (y_{j+1}^R - y_j^R)^2 + (z_{j+1}^R - z_j^R)^2}$$

A model parameter for minimizing energy function E is calculated by the steepest descent method. Specifically, an approximate initial value is set and a model parameter is repeatedly changed according to the following equation (25). In this case, is a minute positive number.

$$\begin{pmatrix} s_m^{NEW} \\ t_n^{NEW} \end{pmatrix} = \begin{pmatrix} s_m^{OLD} \\ t_n^{OLD} \end{pmatrix} - \varepsilon \begin{pmatrix} \frac{\partial E}{\partial s_m} \\ \frac{\partial E}{\partial t_n} \end{pmatrix} \quad (25)$$

Equation (25) is developed using the definition of the energy function of equation (20), the following equation (26) and (27) can be obtained.

$$\frac{\partial E}{\partial s_m} = k_1 \frac{\partial E_1}{\partial s_m} + k_2 \frac{\partial E_2}{\partial s_m} \quad (26)$$

$$\frac{\partial E}{\partial t_n} = k_1 \frac{\partial E_1}{\partial t_n} + k_2 \frac{\partial E_2}{\partial t_n} \quad (27)$$

However, each term is as follows.

$$\frac{\partial E_1}{\partial s_m} = 2(cd - AB) \cdot \frac{1}{cd} \cdot [(x_m^L - x_n^R)(x^K - x_m^L) + (y_m^L - y_n^R)(y^K - y_m^L) + (z_m^L - z_n^R)z^K]$$

$$\frac{\partial E_1}{\partial t_n} = -2(cd - AB) \cdot \frac{1}{cd} \cdot [(x_m^L - x_n^R)(x^K - x_m^L) + (y_m^L - y_n^R)(y^K - y_m^L) + (z_m^L - z_n^R)z^K]$$

-continued $$\frac{\partial E_2}{\partial s_m} = 2(Ac - Bd) \sum_{i=0}^{m-1} \frac{(x_{i+1}^L - x_i^L)}{\|x_{i+1}^L - x_i^L\|} \cdot \begin{pmatrix} (x^K - X_{i+1}^L)\frac{ds_{i+1}}{ds_m} - (x^K - X_i^L)\frac{ds_i}{ds_m} \\ (y^K - Y_{i+1}^L)\frac{ds_{i+1}}{ds_m} - (y^K - Y_i^L)\frac{ds_i}{ds_m} \\ z^K \frac{ds_{i+1}}{ds_m} - z^K \frac{ds_i}{ds_m} \end{pmatrix}$$

$$\frac{ds_i}{ds_m} = \frac{\alpha_i^L \delta_i^L - \beta_i^L \chi_i^L}{(\chi_i^L s_m + \delta_i^L)^2} \quad (i = 0, \ldots, m-1), \quad \frac{ds_m}{ds_m} = 1 \quad (i = m)$$

$$\frac{\partial E_2}{\partial t_n} = 2(Bd - Ac) \sum_{j=0}^{n-1} \frac{(x_{j+1}^R - x_j^R)}{\|x_{j+1}^R - x_j^R\|} \cdot \begin{pmatrix} (x^K - X_{j+1}^R)\frac{dt_{j+1}}{dt_n} - (x^K - X_j^R)\frac{dt_j}{dt_n} \\ (y^K - Y_{j+1}^R)\frac{dt_{j+1}}{dt_n} - (y^K - Y_j^R)\frac{dt_j}{dt_n} \\ z^K \frac{dt_{j+1}}{dt_n} - z^K \frac{dt_j}{dt_n} \end{pmatrix}$$

$$\frac{dt_j}{dt_n} = \frac{\alpha_j^R \delta_j^R - \beta_j^R \chi_j^R}{(\chi_j^R t_n + \delta_j^R)^2} \quad (j = 0, \ldots, n-1), \quad \frac{dt_n}{dt_n} = 1 \quad (j = n)$$

In this way, a model parameter can be calculated and as a result, the coordinates of each three-dimension sample outline point can be calculated. Then, the raised center-folded curved-surface estimation device 902 designates broken lines connecting obtained three-dimension sample outline points as outline lines, and estimates a curved-surface obtained by the linear interpolation approximation of the outlines. For the linear interpolation approximation, an interpolation method, such as a linear Coons interpolation, etc., is used as in the case of a sunken center-folded curved-surface estimation device 202.

Figure 12:
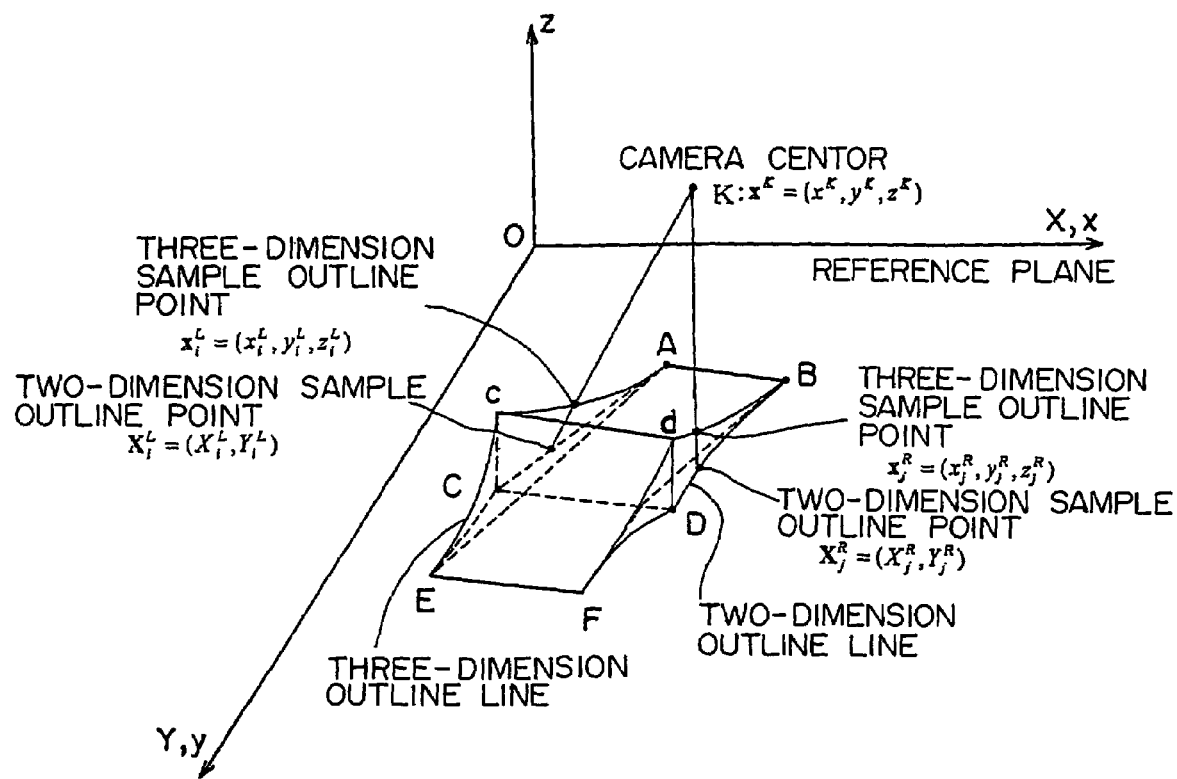
FIG. 12 shows the (entire) raised center-folded curved-surface model.

Although as energy function E, the energy function E of an upper raised center-folded curved-surface is formulated, the energy function E of the entire curved-surface can also be formulated. Energy function E obtained by formulating the entire curved-surface can be expressed by the following equation (28) as shown in FIG. 12.

$$E(s_m, t_n) = k_1 E_1 + k_2 E_2 + k_3 E_3 + k_4 E_4 \quad (28)$$

$$= k_1 (AB - cd)^2 + k_2 (Ac - Bd)^2 + k_3 (EF - cd)^2 + k_4 (cE - dF)^2$$

However, $k_1$, $k_2$, $k_3$, $k_4$ are constants.

In this case, since the optimization problem of the entire curved-surface can be solved, accuracy is further improved than in the case where a curved-surface is horizontally divided, and a model parameter is calculated for each divided curved-surface.

Next, the distortion correction device 903 in the second preferred embodiment is the same as the distortion correction device 203 in the first preferred embodiment. Specifically, the distortion correction device 903 obtains an image after correction with the length of the top/bottom outline and that of the left/right outline as width and height, respectively, by calculating the location in an input image, corresponding to each pixel of an image after correction using a curved coordinate system with outline lines as coordinate axes and by setting the value (binary, gradation or color) of the corresponding pixel in the input image as the target pixel value of the image after correction. For detail, see the description of the first preferred embodiment.

Figure 13:
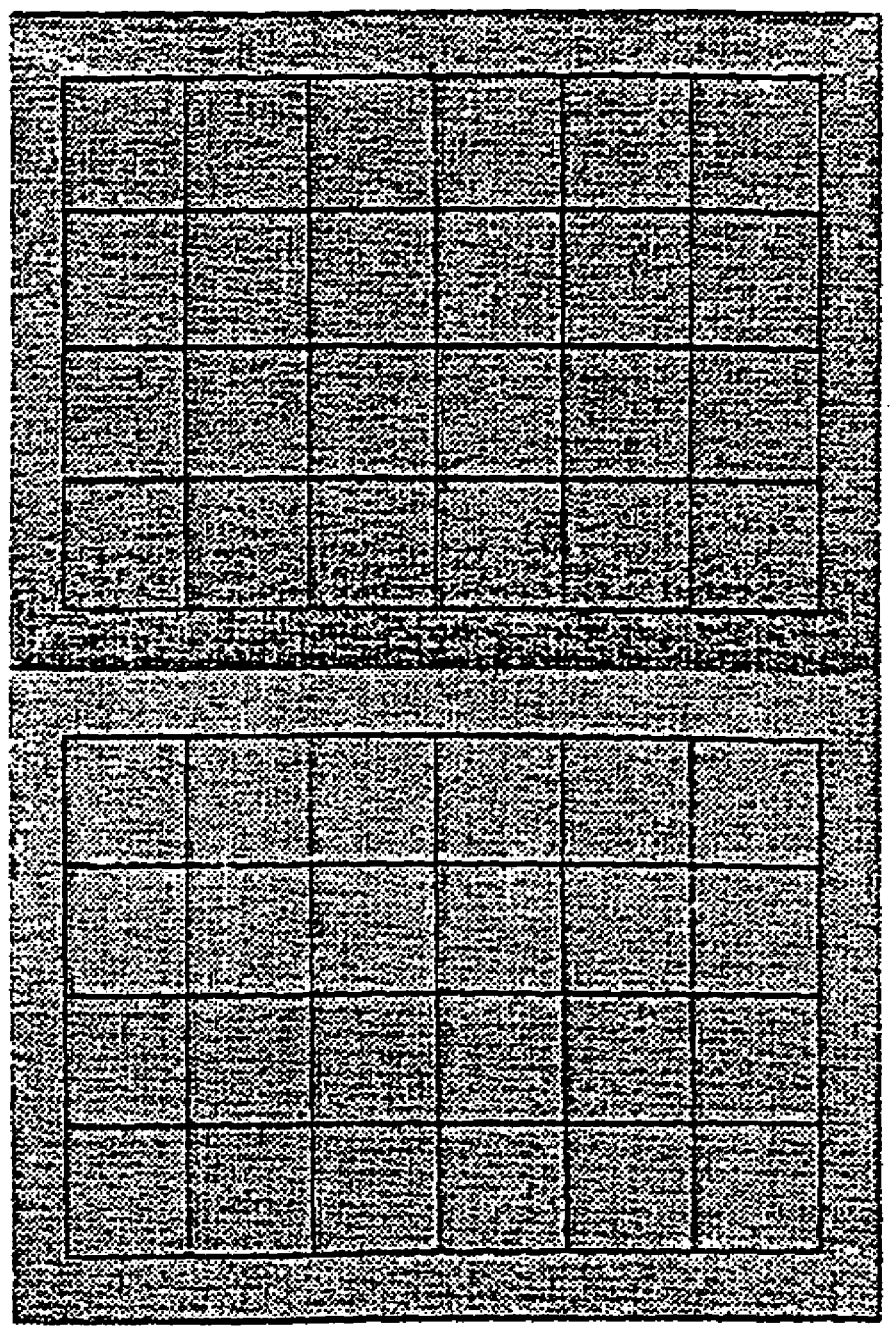
FIG. 13 shows the correction result of raised center-folded distortion.

FIG. 13 shows the correction result of a raised center-folded distortion OHR image processed according to the second preferred embodiment of the present invention. In FIG. 13, the image shown in FIG. 1C is corrected. In this way, according to the second preferred embodiment of the present invention, a raised center-folded distortion OHR image can be satisfactorily corrected.

Although sunken/raised center-folded distortion correction methods for a slip OHR image has been so far described in detail, the application is not limited to the sunken/raised center-folded distortion correction. Specifically, the same method is also applicable to line-textured curved-surface distortion. Line-textured curved-surface is a general curved-surface caused when a piece of paper is distorted.

Figure 1D:
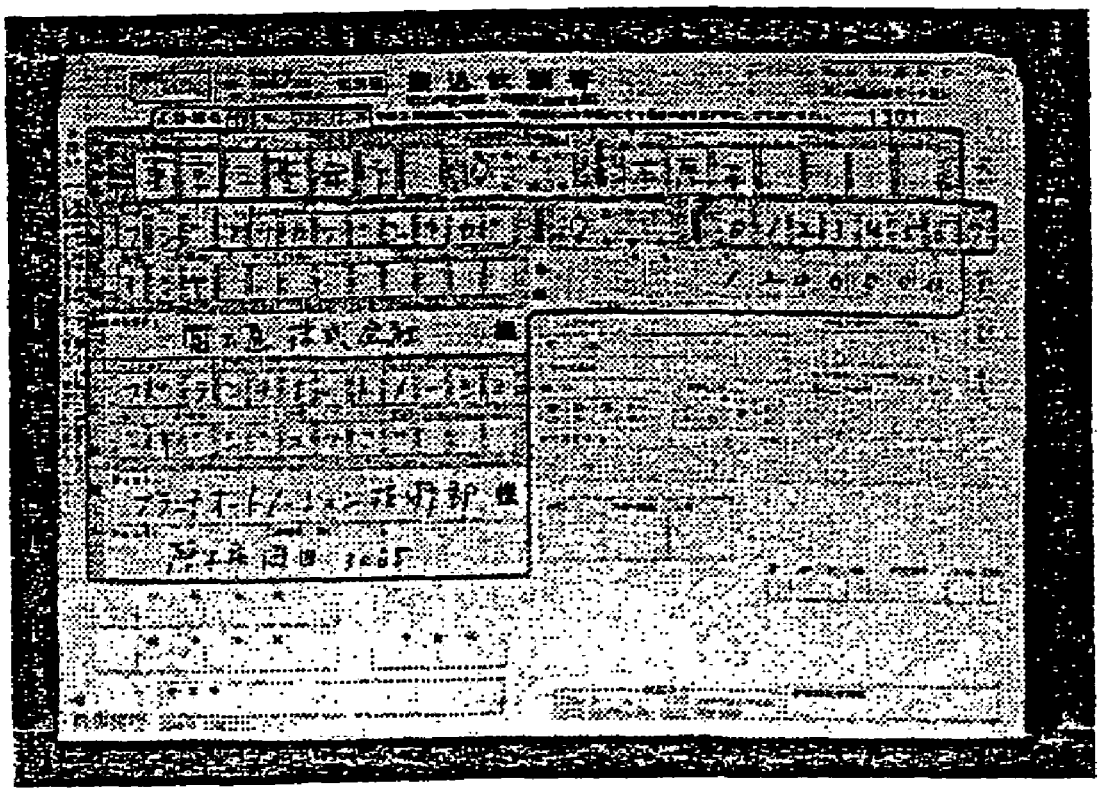
FIG. 1D shows an example of a (raised) circumstance-distortion OHR image.
Figure 1E:
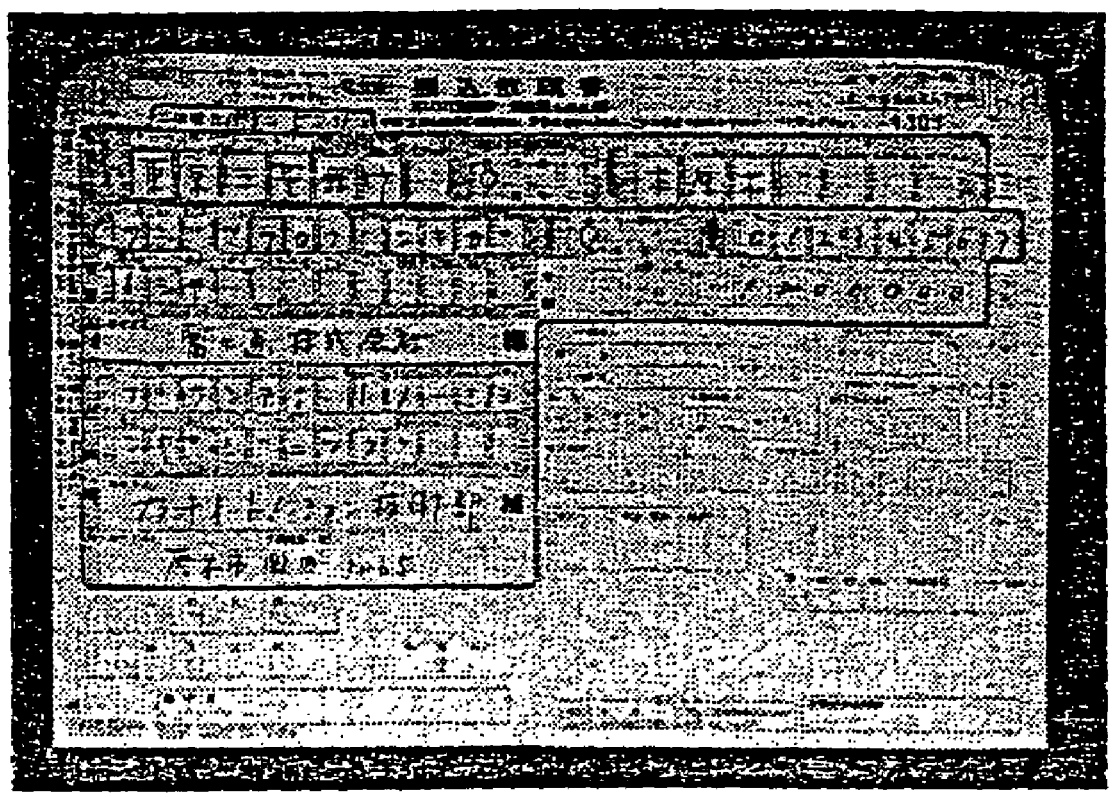
FIG. 1E shows an example of a (sunken) circumstance-distortion OHR image.
Figure 1F:
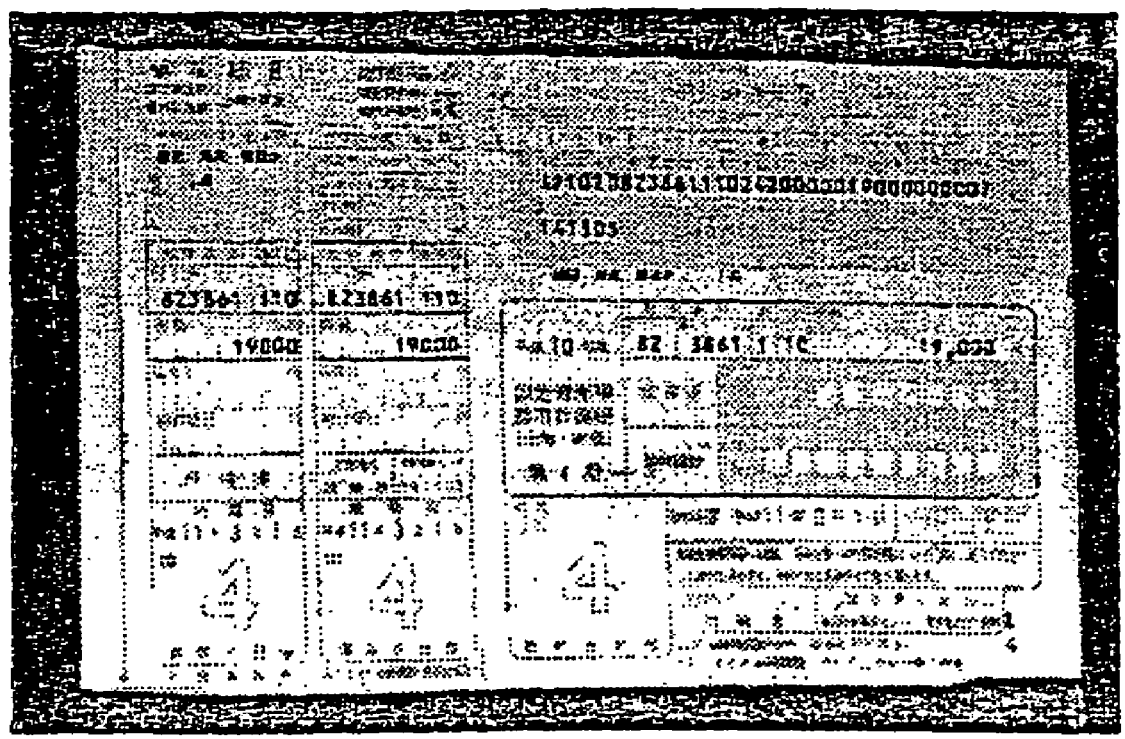
FIG. 1F shows an example of a pamphlet-distortion OHR image.

For example, if there is raised circumference distortion (FIG. 1D) on a slip OHR image as an example of line-textured curved-surface, all three-dimension outlines are curves. Therefore, although in the case of raised center-folded distortion, two model parameters are calculated (the second preferred embodiment of the present invention), a greater number of model parameters (for example, 10 to 20) can also be set, an energy function representing a restriction that the top/bottom outlines are the same in length and the left/right outlines are the same in length can also be formulated and the optimization problem can also be solved. Then, a three-dimension curved-surface model can also be estimated from a calculated model parameter, distortion on an input image can also be corrected based on the estimated curved-surface model and the corrected image can also be outputted. Similarly, the three-dimension curved-surface models of both sunken circumference distortion (FIG. 1E) and pamphlet distortion (FIG. 1F) can also be estimated by setting a greater number of model parameters and distortion can also be corrected.

Figure 14:
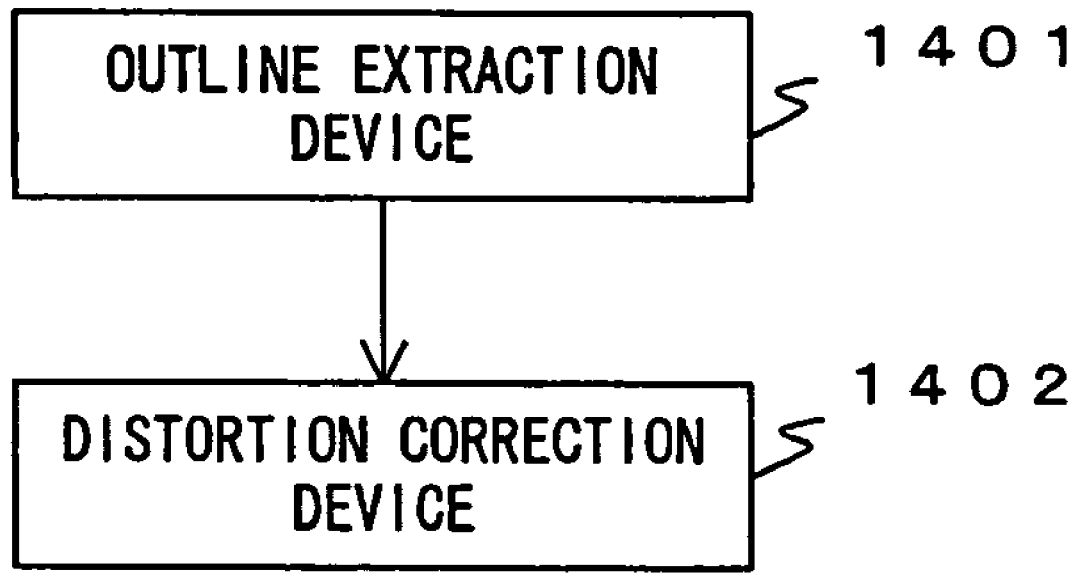
FIG. 14 shows the configuration in the case where distortion is corrected without estimating a curved surface.

In the description of each preferred embodiment, the outline extraction device 101 extracts outlines according to the basic configuration of the present invention shown in FIG. 2A, the curved-surface estimation device 102 estimates a three-dimension model using outline distortion as a clue, and the distortion correction device 103 corrects the distortion based on the estimated three-dimension curved-surface model and outputs the corrected image. However, as shown in FIG. 14, it can also be configured so that a correction device 1402 can correct distortion using outline distortion extracted by an outline extraction device 1401 as a clue without estimating a curved-surface and can output the corrected image.

The outline extraction device 1401 performs the same process as that of the outline extraction device 101. However, the distortion correction device 1402 is described using as an example, a case where an outline 1501 as shown in FIG. 15 is obtained. First, the distortion correction device 1402 horizontally enlarges/reduces the outline 1501 in accordance with each line segment length of top outline 1502, center-folded outline 1503 and bottom outline 1503 of the extracted outline 1502 (A1). Then, the device 1402 approximates the curved portions (1505-1 through 1505-8) of each section surrounded by dotted lines as shown in FIG. 15 with a straight line and calculates both the inclination of the straight line and vertical reduction from the inclination. The device 1402 further vertically enlarges/reduces the horizontally enlarged/reduced outlines according to the required reduction degree (A2). In this way, it can also be configured so that distortion can be corrected by a two-dimension data process without estimating a three-dimension curved-surface model.

However, the distortion correction method can also be executed using an information processing device (computer) as shown in FIG. 16. The information processing device shown in FIG. 16 comprises a CPU (central processing unit) 1601, a memory 1602, an input device 1603, an output device 1604, an external storage device 1605, a medium driver device 1606 and a network connection device 1607, and these are connected by a bus 1608 with one another.

The memory 1602 includes, for example, a ROM (read-only memory), a RAM (random-access memory), etc., and stores both a program and data to be used, for the process. The CPU 1601 performs necessary processes by using the memory 1602 and executing the program. Specifically, the outline extraction device 101, curved-surface estimation device 102 and distortion correction device 103 are implemented by the program stored in the memory 1602.

Image data, such as a slip, etc., are inputted to the information processing device via the input device 1603, such as an OHR, etc. the output device 1604 includes, for example, a display, a printer, etc., and is used to out the process result, etc.

The external storage device 1605 includes, for example, a magnetic disk, an optical disk, a magneto-optical disk, etc. The information processing device can store both the program and data in this external storage device 1605 and can use them by loading them into the memory 1602 as requested.

The medium driver device 1606 drives a portable storage medium 1609 and accesses the recorded content. For the portable storage medium 1609, an arbitrary computer-readable storage medium, such as a memory card, a floppy disk, a CD-ROM (compact disk read-only memory), an optical disk, magneto-optical disk, etc., are used. Both the program and data can be stored in this portable storage medium 1609, and can be used by loading them into the memory 1602 as requested.

The network connection device 1607 communicates with an ouutside device via an arbitrary network (line), such as a LAN (local area network), etc., and transmits/receives data accompanying the communications. The information processing device can receive both the program and data from the outside device via the network connection device 1607, and can 10 use them by loading them into the memory 1602. Although a single information processing device is used in FIG. 16, this can also be implemented by a process device consisting of a plurality of computers or a plurality of process devices via a network.

FIG. 17 shows how to provide a software program, etc., to be executed by the information processing device of the present invention. The program, etc., can be provided, for example, any of the following three methods (a) through (c).

(a) The program, etc., is installed in an information processing device 1701, such as a computer, etc., and provided. In this case, the program, etc., is installed, for example, prior to shipment.

(b) The program, etc., is stored in the portable storage medium 1609 and provided. In this case, the program, etc., stored in the portable storage medium 16609 is stalled in the external storage device 1605 of the information processing device 1701, such as a computer, etc.

(c) The program, etc., is provided from a server 1703 in the network 1702. In this case, basically the information processing device 1701, such as a computer, etc., downloads the program, etc., stored in the server 1703 and obtains the program, etc.

In this case, the server 1703 generates a propagation signal for propagating both the program and data, and transmits the signal to the information processing device 1701 via an arbitrary transmission medium in the network 1702.

As described above, according to the present invention, the three-dimension model of a slip with three-dimension distortion can be estimated using both two-dimension outlines obtained from a piece of image (OHR image) photographed from the top and a restriction that the paper is rectangular, and the three-dimension distortion in the image can be corrected using the obtained three-dimension curved-surface model. In this way, since an input image can be corrected using the distortion of two-dimension outline obtained by a piece of a paper, one camera is sufficient and both implement cost and installation space can be reduced compared with the conventional technology.

What is claimed is:

1. A distortion correction device, comprising:
an outline extraction device extracting regular graphics attached to a piece of rectangular paper from an input image obtained by photographing the paper;
a curved-surface estimation device estimating a three-dimensional curved-surface model having three dimensional coordinates for points of the paper using distortion of the regular graphics as a clue;
a distortion correction device correcting the distortion based on the three-dimensional curved-surface model and outputting a corrected image as an output image; and
wherein said curved-surface estimation device estimates a three-dimensional curved-surface model by expressing a restriction that a horizontal or vertical pair of length of three-dimensional regular graphics are the same with an energy function and solving an optimization problem of calculating a parameter of the three-dimensional curved-surface model, the energy of which becomes a minimum.

2. A distortion correction device, comprising:
an outline extraction device extracting horizontal and vertical lines written in a piece of rectangular paper from an input image obtained by photographing the paper;
a curved-surface estimation device estimating a three-dimensional curved-surface model having three dimensional coordinates for points of the paper using distortion at an intersection of the horizontal and vertical lines written in the paper as a clue;
a distortion correction device correcting the distortion based on the three-dimensional curved-surface model and outputting a corrected image as an output image; and
wherein said curved-surface estimation device estimates a three-dimensional curved-surface model by expressing a restriction that a horizontal or vertical pair of length of three-dimensional horizontal and vertical lines are the same with an energy function and solving an optimization problem of calculating a parameter of the three-dimensional curved-surface model, the energy of which becomes a minimum.

3. A distortion correction device, comprising:
an outline extraction device extracting horizontal and vertical character strings written in a piece of rectangular paper from the input image obtained by photographing the paper;
a curved-surface estimation device estimating a three-dimensional curved-surface model having three dimensional coordinates for points of the paper using distortion at an intersection of the horizontal and vertical character strings written in the paper as a clue;
a distortion correction device correcting the distortion based on the three-dimensional curved-surface model and outputting a corrected image as an output image; and
wherein said curved-surface estimation device estimates a three-dimensional curved-surface model by expressing a restriction that a horizontal or vertical pair of length of three-dimensional horizontal and vertical character strings are the same with an energy function and solving an optimization problem of calculating a parameter of the three-dimensional curved-surface model, the energy of which becomes a minimum.

4. A distortion correction method, comprising:
extracting regular graphics attached to a piece of rectangular paper from an input image obtained by photographing the paper;
estimating a three-dimensional curved-surface model having three dimensional coordinates for points of the paper using distortion of the regular graphics as a clue;
correcting the distortion based on the three-dimensional curved-surface model and outputting a corrected image as an output image; and
wherein said curved-surface estimation device estimates a three-dimensional curved-surface model by expressing a restriction that a horizontal or vertical pair of length of three-dimensional regular graphics are the same with an energy function and solving an optimization problem of calculating a parameter of the three-dimensional curved-surface model, the energy of which becomes a minimum.

5. A distortion correction method, comprising:
extracting horizontal and vertical lines written in a piece of rectangular paper from an input image obtained by photographing the paper;
estimating a three-dimensional curved-surface model having three dimensional coordinates for points of the paper using distortion at an intersection of the horizontal and vertical lines written in the paper as a clue;
correcting the distortion based on the three-dimensional curved-surface model and outputting a corrected image as an output image; and
wherein said curved-surface estimation device estimates a three-dimensional curved-surface model by expressing a restriction that a horizontal or vertical pair of length of three-dimensional horizontal and vertical lines are the same with an energy function and solving an optimization problem of calculating a parameter of the three-dimensional curved-surface model, the energy of which becomes a minimum.

6. A distortion correction method, comprising:
extracting horizontal and vertical character strings written in a piece of rectangular paper from the input image obtained by photographing the paper;
estimating a three-dimensional curved-surface model having three dimensional coordinates for points of the paper using distortion at an intersection of the horizontal and vertical character strings written in the paper as a clue;
correcting the distortion based on the three-dimensional curved-surface model and outputting a corrected image as an output image; and
wherein said curved-surface estimation device estimates a three-dimensional curved-surface model by expressing a restriction that a horizontal or vertical pair of length of three-dimensional horizontal and vertical character strings are the same with an energy function and solving an optimization problem of calculating a parameter of the three-dimensional curved-surface model, the energy of which becomes a minimum.

* * * * *